(12) United States Patent
Itoh et al.

(10) Patent No.: US 7,170,531 B2
(45) Date of Patent: Jan. 30, 2007

(54) PROJECTION DISPLAY APPARATUS, DISPLAY METHOD FOR SAME AND IMAGE DISPLAY APPARATUS

(75) Inventors: Takafumi Itoh, Matsumoto (JP); Shoichi Akaiwa, Matsumoto (JP); Kiyoshi Miyashita, Ina (JP)

(73) Assignee: Seiko Epson Corporation, Tokyo (JP)

( * ) Notice: Subject to any disclaimer, the term of this patent is extended or adjusted under 35 U.S.C. 154(b) by 50 days.

(21) Appl. No.: 10/307,342

(22) Filed: Dec. 2, 2002

(65) Prior Publication Data

US 2003/0117385 A1 Jun. 26, 2003

Related U.S. Application Data

(60) Division of application No. 09/631,698, filed on Aug. 3, 2000, which is a continuation of application No. PCT/JP99/00434, filed on Aug. 16, 1999.

(30) Foreign Application Priority Data

Feb. 3, 1998 (JP) ................................ 10-36715
Jul. 15, 1998 (JP) ................................ 10-218618

(51) Int. Cl.
*G09G 5/00* (2006.01)

(52) U.S. Cl. .................................. 345/629; 715/861
(58) Field of Classification Search ................ 345/204, 345/629, 157, 158; 348/584, 588, 589, 600, 348/60; 715/730, 856, 720, 861
See application file for complete search history.

(56) References Cited

U.S. PATENT DOCUMENTS 5,355,173 A 10/1994 Fujita (Continued)

FOREIGN PATENT DOCUMENTS

EP 0 525 943 A2 2/1993

(Continued)

OTHER PUBLICATIONS

"Illustrations of menu screen and starting position/plurality of pointer images," Windows NT 1981-1998; screen captures, pp. 2-4.*

(Continued)

*Primary Examiner*—Kent Chang
(74) *Attorney, Agent, or Firm*—Oblon, Spivak, McClelland, Maier & Neustadt, P.C.

(57) ABSTRACT

The present invention provides a technology that enables projection images to be overlaid with embellishment effects without depending on the capabilities of the image supply apparatus. A projection display apparatus that projects images onto a screen responsive to given image data, comprises: an embellishment effect memory for storing embellishment effect data representing an embellishment effect image that can be used to embellish an arbitrary image; an image embellishment section that generates embellished image data by overlaying an original image represented by the given image data and the embellishment effect image; a light modulation unit that is driven responsive to the embellished image data pixel by pixel; and an optical system for projecting onto the screen the embellished image obtained by the light modulation unit. A projection display apparatus superimposes the embellishment effect on the projected image without having to rely on the capabilities of an image supply apparatus.

4 Claims, 31 Drawing Sheets

U.S. PATENT DOCUMENTS 5,428,417 A * 6/1995 Lichtenstein ................ 353/122
6,091,408 A * 7/2000 Treibitz et al. ............. 715/753

FOREIGN PATENT DOCUMENTS

| JP | A 56-47087 | 4/1981 |
| JP | A 56-67475 | 6/1981 |
| JP | A 58-163992 | 9/1983 |
| JP | 59-186065 | 10/1984 |
| JP | A 63-271394 | 11/1988 |
| JP | A 1-265291 | 10/1989 |
| JP | 2-52396 | 2/1990 |
| JP | A 3-150592 | 6/1991 |
| JP | 03-257520 | 11/1991 |
| JP | A 4-195090 | 7/1992 |
| JP | 04-280294 | 10/1992 |
| JP | A 5-56348 | 3/1993 |
| JP | 5-120405 | 5/1993 |
| JP | 5-265412 | 10/1993 |
| JP | A 5-266108 | 10/1993 |
| JP | A 6-139042 | 5/1994 |
| JP | 6-295339 | 10/1994 |
| JP | 08-161142 | 6/1996 |
| JP | A 11-4395 | 1/1999 |

OTHER PUBLICATIONS

"Illustrations of menu screen and pointer shape and color," Microsoft Paint 1981-2001, screen captures, pp. 1-2.*

* cited by examiner $xc \geqq x1$
$yc \geqq y1$ $xc < x1$
$yc \geqq y1$ $xc < x1$
$yc < y1$ $xc \geqq x1$
$yc < y1$

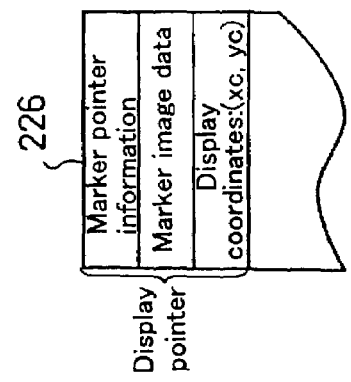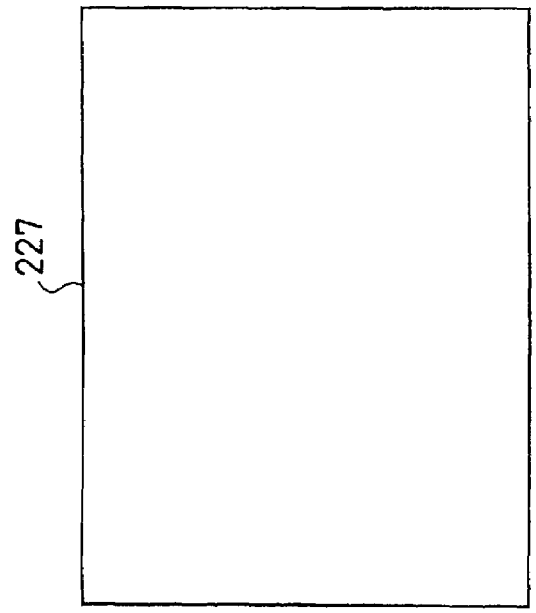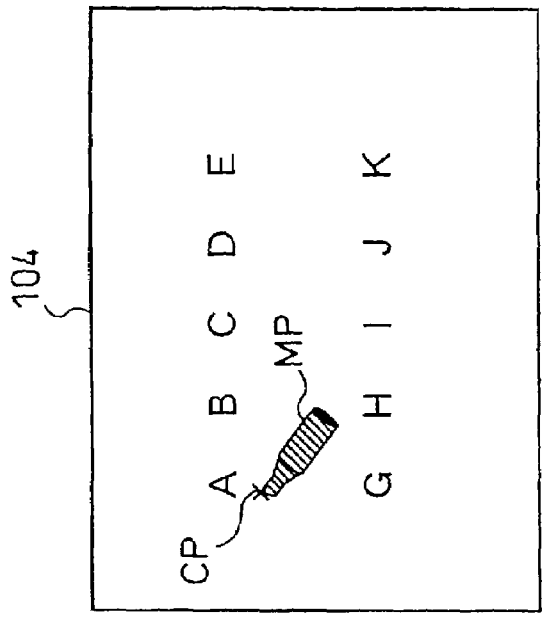

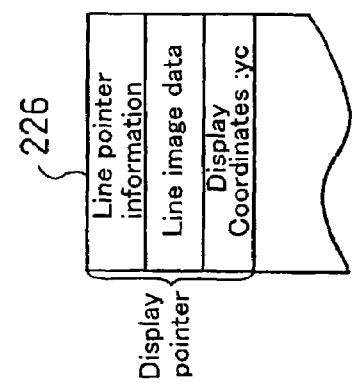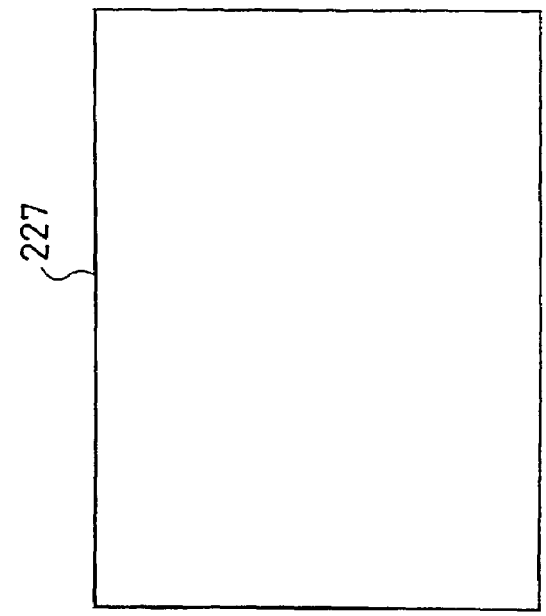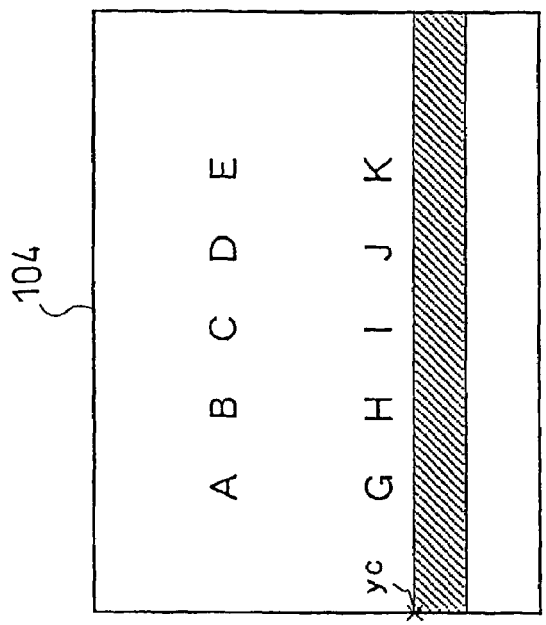

PROJECTION DISPLAY APPARATUS, DISPLAY METHOD FOR SAME AND IMAGE DISPLAY APPARATUS

TECHNICAL FIELD

The present invention relates to an image display apparatus, particularly to a projection display apparatus technology that project images onto a screen based on given image data.

BACKGROUND ART

The ability of projection display apparatuses to display enlarged given images on a projection screen has led to their extensive use in presentations. In a presentation an explanation is provided based on projected images, so it is convenient to be able to overlay the images with an embellishment effect image (embellishment image) such as an arrow graphic or the like to indicate specific locations on the projected image.

In prior art projection display apparatuses, when, for example, an embellishment effect image is overlaid on an original image given from a personal computer, the embellishment effect image has been overlaid in the personal computer. Based on overlay image signals output from the personal computer, the projection display apparatus displays on the projection screen the image on which the embellishment effect image is overlaid. However, in this case, it has been necessary for a specific application program to be installed beforehand in the personal computer for performing processing based on commands from the projection display apparatus. Moreover, when signals given to the projection display apparatus are image signals output from a video recorder or television, it has not been possible to overlay an embellishment effect image on the original image. That is, a problem has been that whether or not an embellishment effect can be imparted to a projected image has depended on the capabilities of the image supply apparatus that supplies an image to the projection display apparatus.

DISCLOSURE OF THE INVENTION

This invention was accomplished to resolve the foregoing problems of the prior art, and has as its object to provide a technology that enables projection images to be overlaid with embellishment effects without depending on the capabilities of the image supply apparatus.

To resolve at least part of the above problems, a first projection display apparatus of the present invention comprises: an embellishment effect memory for storing embellishment effect data representing an embellishment effect image that can be used to embellish an arbitrary image; an image embellishment section that generates embellished image data by overlaying an original image represented by the given image data and the embellishment effect image; a light modulation unit that is driven in response to the embellished image data pixel by pixel; and an optical system for projecting onto the screen the embellished image obtained by the light modulation unit.

Since this projection display apparatus is equipped with an image embellishment section for overlaying the embellishment effect images internally, it is able to overlay the embellishment effect images internally without having to rely on the capabilities of an image supply apparatus.

In the projection display apparatus, the image embellishment section may comprise an image overlay section that overlays the embellishment effect image at a specified location on the original image.

Doing this makes it possible for the image overlay section to be used to overlay an embellishment effect image at a desired position on an original image, thereby increasing the degree of embellishment effect image overlay freedom.

In accordance with another preferable application of the projection display apparatus, the embellishment effect memory stores a plurality of embellishment effect data representing a plurality of embellishment effect images; and the image overlay section superimposes at least one selected embellishment image at each specified position on the original image.

Doing this makes it possible to select any desired embellishment effect image from among a plurality of embellishment effect images, enabling more effective embellishment effect image to be selected and overlaid on the original image.

In the projection display apparatus, it is preferable for the image overlay section to include an embellishment effect bitmap memory for storing embellishment effect bitmap data obtained from the embellishment effect data; a synthesizer section that generates the embellished image data by synthesizing the given image data and the embellishment effect bitmap data read from the embellishment effect bitmap memory; and a frame memory for storing the embellished image data, the frame memory having at least a memory area corresponding to all the pixels of the light modulation unit, the embellished image data read out from the frame memory being provided to the light modulation unit.

Since in this projection display apparatus the embellished image data in which the embellishment effect image is overlaid on an given original image is written into the frame memory, embellished images can be obtained by reading out embellished image data from the frame memory.

Alternatively, the image overlay section in the projection display apparatus can include an embellishment effect bitmap memory for storing embellishment effect bitmap data obtained from the embellishment effect data; a frame memory for storing the given image data, the frame memory having at least a memory area corresponding to all the pixels of the light modulation unit; and a synthesizer section that generates the embellished image data by synthesizing image data read from the frame memory and the embellishment effect bitmap data read from the embellishment effect bitmap memory, the embellished image data synthesized by the synthesizer section being provided to the light modulation unit.

This projection display apparatus also enables embellished image data to be obtained and has the same function and advantage as the above projection display apparatus. However, while in the above projection display apparatus embellished image data is read from a frame memory and displayed, in this projection display apparatus embellishment effect images are overlaid as the image data written to the frame memory is being read out, enabling the time from the command to overlay the embellishment effect image to the display of the embellished images to be shortened.

In the above projection display apparatus, the synthesizer section may comprise a data selector that selects either one of the image data and the embellishment effect bitmap data, pixel by pixel, to produce the embellished image data.

Since in this projection display apparatus the data selector selects either image data or embellishment effect bitmap data, an embellishment image can be overlaid on an original image by substituting embellishment effect bitmap data for a portion of the image data.

Alternatively, the synthesizer section of the above projection display apparatus may comprise a multiplier section that multiples the image data and the embellishment effect bitmap data by respective coefficients on a pixel by pixel basis; and an adder section that adds the embellishment effect bitmap data and the image data thus multiplied by the multiplier section, on a pixel by pixel basis.

In this projection display apparatus, the density (brightness) ratio between embellishment effect images and original images can be adjusted by setting the coefficients appropriately.

It is also desirable for the synthesizer section of the projection display apparatus to include a coefficient setting section that controls the coefficients in the multiplier section so as to change a synthesis ratio between the image data and the embellishment effect bitmap data, thereby adjusting a degree of transparency of embellishment effects.

By doing this, the degree of transparency of embellishment effects can be changed by controlling the coefficients of the multiplier section.

In the above projection display apparatus, the coefficient setting section may change the coefficients in the multiplier section with time so as to change the synthesis ratio between the image data and embellishment effect bitmap data, thereby changing the degree of transparency of the embellishment effects with time.

By doing this, the degree of transparency of embellishment effects can be changed with time by changing the coefficients of the multiplier section with time.

A second projection display apparatus according to the invention comprises: a frame memory for storing given original image data; a first embellishment memory for storing a first embellishment image data representing a first embellishment image having a shape and size that can be set; a second embellishment memory for storing a second embellishment image data representing a second embellishment image having a size that can be altered while a shape is maintained similar; an image embellishment section that generates embellished image data representing embellished image by overlaying an original image represented by the original image data with at least one of the first embellishment image and the second embellishment image; an image display signal generator for generating image display signals based on the embellished image data; an electro-optical device for emitting light that forms images in response to the image display signals; and a projection optical system for projecting light emitted by the electro-optical device.

Since this projection display apparatus is equipped with an image embellishment section for overlaying embellishment image on original image, the projection display apparatus is able to overlay the embellishment images internally so it can be made to overlay the embellishment image on a given original image without having to rely on the capabilities of the image supply apparatus. Moreover, the ability to overlay the original image with at least one selected from the first embellishment image in which the shape and size can be set, and the second embellishment image in which a shape can be maintained similar while the size is altered, enables more effective embellishment of original images to be implemented.

In accordance with another preferable application of the projection display apparatus, the first embellishment memory has a memory space to hold 1/n (where n is an integer of at least 1) lines and 1/n pixels of the frame memory and stores the first embellishment image data in an area corresponding to the position at which the first embellishment images are to be superimposed; and the second embellishment memory stores the second embellishment image data and stores at least coordinate data indicating the overlay position thereof the original image.

With this configuration, embellished image data can be obtained by overlaying the original image data read from the frame memory with at least one selected from the first embellishment image data read from the first embellishment memory and the second embellishment image data read from the second embellishment memory. Moreover, the embellishment image can be superimposed on the original image without changing the original image data written to the frame memory.

In the above projection display apparatus, it is preferable for n to be an integer of at least 2.

Since this enables the first embellishment images can be stored using a smaller storage capacity than the frame memory, it is advantageous for reducing the size of the apparatus.

In above projection display apparatus, it is preferable for the image embellishment section to be provided with a multiplier section that multiples the original image data read from the frame memory and one of the first embellishment image data from the first embellishment memory and the second embellishment image data from the second embellishment memory by respective coefficients on a pixel by pixel basis; and an adder section that adds one of the first embellishment image data and the second embellishment image data and the original image data multiplied by the respective coefficients, pixel by pixel Doing this enables the density (brightness) ratio between an original image and either one of the first embellishment image and the second embellishment image to be adjusted by setting the coefficients appropriately.

It is also desirable for the image embellishment section to include a coefficient setting section that controls the coefficients in the multiplier section so as to change a synthesis ratio between the original image data and one of the first embellishment image data and the second embellishment image data, thereby adjusting a degree of transparency of embellishment effects.

By doing this, the degree of transparency of the first and second embellishment images can be changed by controlling the coefficients of the multiplier section.

It is also preferable for the projection display apparatus to be equipped with a storage memory for storing a plurality of embellishment image data as the second embellishment image data; wherein the second embellishment memory stores at least one embellishment image data selected from the storage memory.

In this way, original images can be overlaid with more effective embellishment images by selecting a desired embellishment image from among a plurality of embellishment image data prepared beforehand.

It is also preferable for the image embellishment section of the projection display apparatus to include a drawing section that draws the first embellishment image based on set drawing conditions; the drawing section drawing the first embellishment image in the first embellishment memory based on at least a shape and position of the first embellishment image set by a user using a drawing instruction image which is one of the second embellishment images selected for setting conditions for drawing the first embellishment image.

This makes it possible to readily set a shape and position of a first embellishment image to be drawn by the drawing section, by using drawing instruction image comprised by the second embellishment images selected to set the conditions for drawing the first embellishment image.

In this projection display apparatus, also, when the shape and position of the first embellishment image are to be set by using at least two drawing instruction images, the drawing section selects the at least two drawing instruction images having associated shapes which indicate the shape and position of the first embellishment image concerned, reads out the selected drawing instruction images from the storage memory and stores them in the second embellishment memory.

When setting the first embellishment image, this enables a user to readily ascertain the shape and position and the like of the first embellishment image.

A first image display apparatus of this invention comprises: a frame memory for storing given original image data; a first embellishment memory for storing a first embellishment image data representing a first embellishment image having a shape and size that can be set; a second embellishment memory for storing a second embellishment image data representing a second embellishment image having a size that can be altered while a shape is maintained similar; an image embellishment section that generates embellished image data by overlaying an original image represented by the original image data with at least one of the first embellishment image and the second embellishment image; an image display signal generator for generating image display signals based on the embellished image data; and an electro-optical device for emitting light that forms images in response to the image display signals.

This image display apparatus has the same function and advantage as the above projection display apparatus and can overlay an original image with embellishment image without having to rely on the capabilities of an image supply apparatus. It can also effect more effective embellishment of an original image.

A first display method of this invention is a method that uses a projection display apparatus with a light modulation unit to display an image based on image data given to the projection display apparatus by projecting the image onto a screen, which comprises the steps of: preparing embellishment effect data representing an embellishment effect image that is used to embellish an arbitrary image; generating embellished image data representing embellished image by overlaying an original image represented by the given image data and the embellishment effect image; driving the light modulation unit in response to the embellished image data pixel by pixel; and projecting onto the screen the embellished image obtained by the light modulation unit.

Using this method also provides the same function and advantage as the first projection display apparatus of the invention, enabling a given original image to be overlaid with embellishment images without having to rely on the capabilities of the image supply apparatus.

A second display method of this invention is a method of displaying an image obtained by embellishment of original image data given to a projection display apparatus, which comprises the steps of: storing given original image data; storing a first embellishment image data representing a first embellishment image having a shape and size that can be set; storing a second embellishment image data representing a second embellishment image having a size that can be altered while a shape is maintained similar; and generating embellished image data representing embellished image by overlaying an original image represented by the original image data with at least one of the first embellishment image and the second embellishment image.

Using this method provides the same function and advantage as the second projection display apparatus of the invention, enabling a given original image to be overlaid with embellishment images without having to rely on the capabilities of the image supply apparatus.

A display control method of the present invention is a display control method of a projection display apparatus that displays embellishment image overlaid on a given original image, which comprises the steps of: using a remote controller so as to display a menu screen overlay; using the remote controller so as to select from the menu a desired embellishment image among a plurality of embellishment images and an embellishment image display condition such as color; erasing the menu screen and displaying an overlay of the selected embellishment image and a display pointer image symbolizing the display condition; using the remote controller so as to move the display pointer image and display an overlay of a starting pointer image at a starting position determined for the embellishment image; and using the remote controller to again move the display pointer image and determine an end position of the embellishment image to display an overlay of the embellishment image between the starting position and the end position determined for the embellishment image.

This enables a person using the projection display apparatus to make a presentation to remotely overlay an embellishment image at a point on the original image to which he wishes to draw attention. When there are a plurality of embellishment images available, using pointer images (icons) that represent an embellishment image type and display conditions such as color facilitates operation. Controlling the display of embellishment images can be further facilitated by using starting pointer images that symbolize the type of embellishment image and the display conditions (color, line width, etc.).

In the above display control method, the starting position pointer images may comprise a plurality of pointer images that indicate a direction of the embellishment image overlay, and when the display pointer image is moved, one pointer image is selected from the plurality of pointer images based on a direction in which the display pointer image is moving relative to the starting position.

In the above display control method, also, the embellishment image represents at least one of a line and area whose color can be selected from a plurality of colors, and at least the display pointer image is displayed overlaid as an image having a color corresponding to the selected color.

This type of image display can make it easier for a user to control an embellishment image displayed overlaid on an original image.

A computer program recorded on a recording medium can be used to enable at least part of the functions of the steps and parts described in the foregoing to be implemented by a computer.

BRIEF DESCRIPTION OF THE DRAWINGS

FIG. 28(a)-(c) are diagrams for explaining the process of overlaying an original image with a marker image.

FIG. 31(a)-(c) are diagrams for explaining the process of overlaying an original image with a line image.

BEST MODES OF CARRYING OUT THE INVENTION

A. First Embodiment

Figure 1:
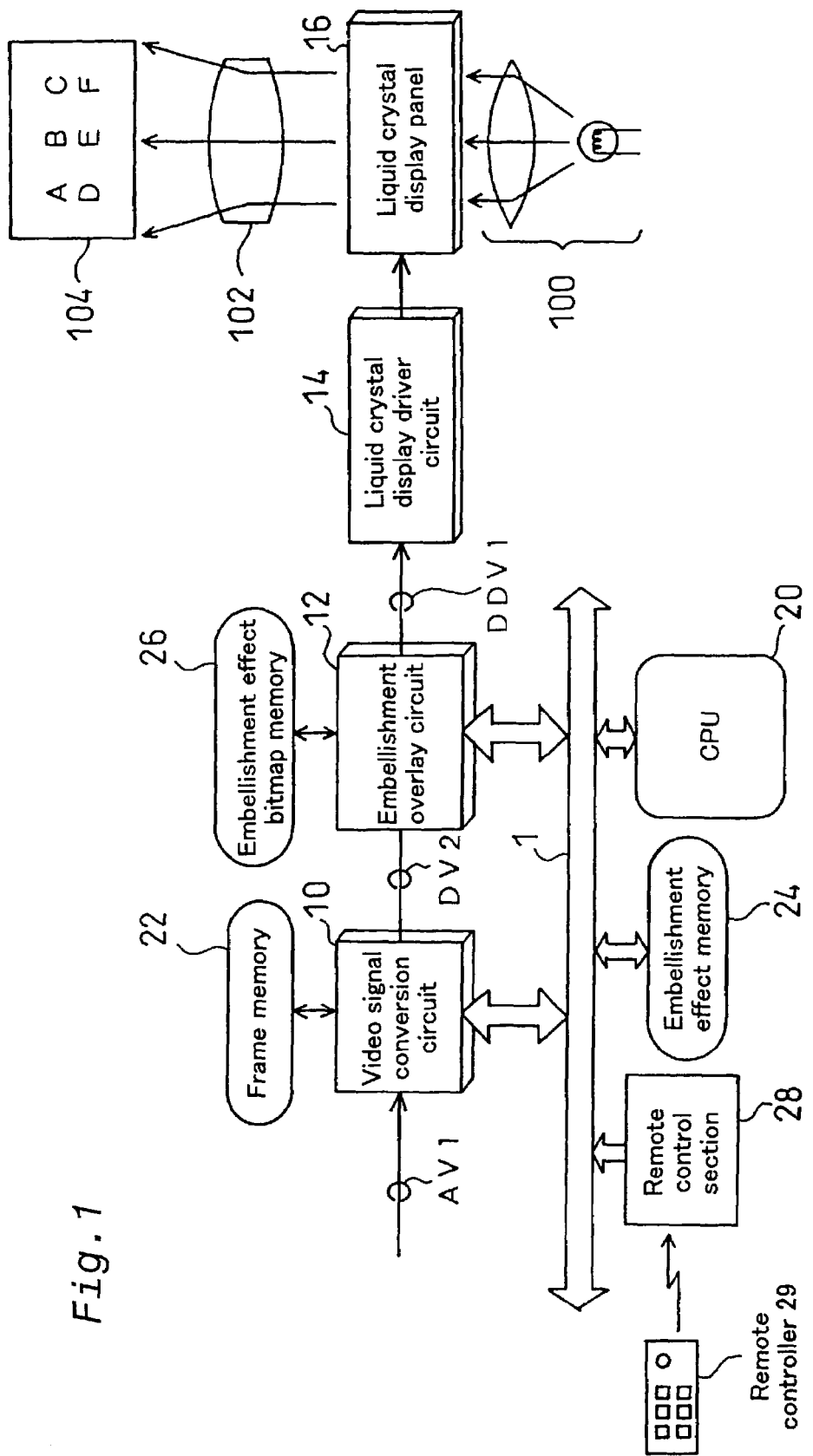
FIG. 1 is a block diagram for schematically illustrating the general configuration of a projection display apparatus that is a first embodiment of this invention.

Modes of carrying out the invention will now be explained with reference to embodiments. FIG. 1 is a block diagram for schematically illustrating the general configuration of a projection display apparatus that is a first embodiment of this invention. The projection display apparatus includes a video signal conversion circuit 10, an embellishment overlay circuit 12, a liquid crystal display driver circuit 14, a liquid crystal display panel 16, a frame memory 22, an embellishment effect memory 24, an embellishment effect bitmap memory 26, a remote control section 28, a CPU 20, an illumination optical system 100 and a projection optical system 102. The video signal conversion circuit 10, embellishment overlay circuit 12, embellishment effect memory 24, remote control section 28 and CPU 20 are connected to each other via a bus 1. The liquid crystal display driver circuit 14 is also connected to the bus 1, but this is not shown in FIG. 1. The liquid crystal display panel 16 is uniformly illuminated by the illumination optical system 100, and images displayed on the liquid crystal display panel 16 are projected onto the projection screen 104 by the projection optical system 102. The optical systems 100 and 102 are shown in a simplified fashion.

The video signal conversion circuit 10 is used to perform analog-digital conversion of analog video signals AV1, write the converted image data into the frame memory 22 and retrieve image data from the frame memory 22. The analog video signal AV1 can be an RGB signal S1 carrying a computer screen image, or a composite image signal S2 from a video recorder, TV or the like.

Figure 2:
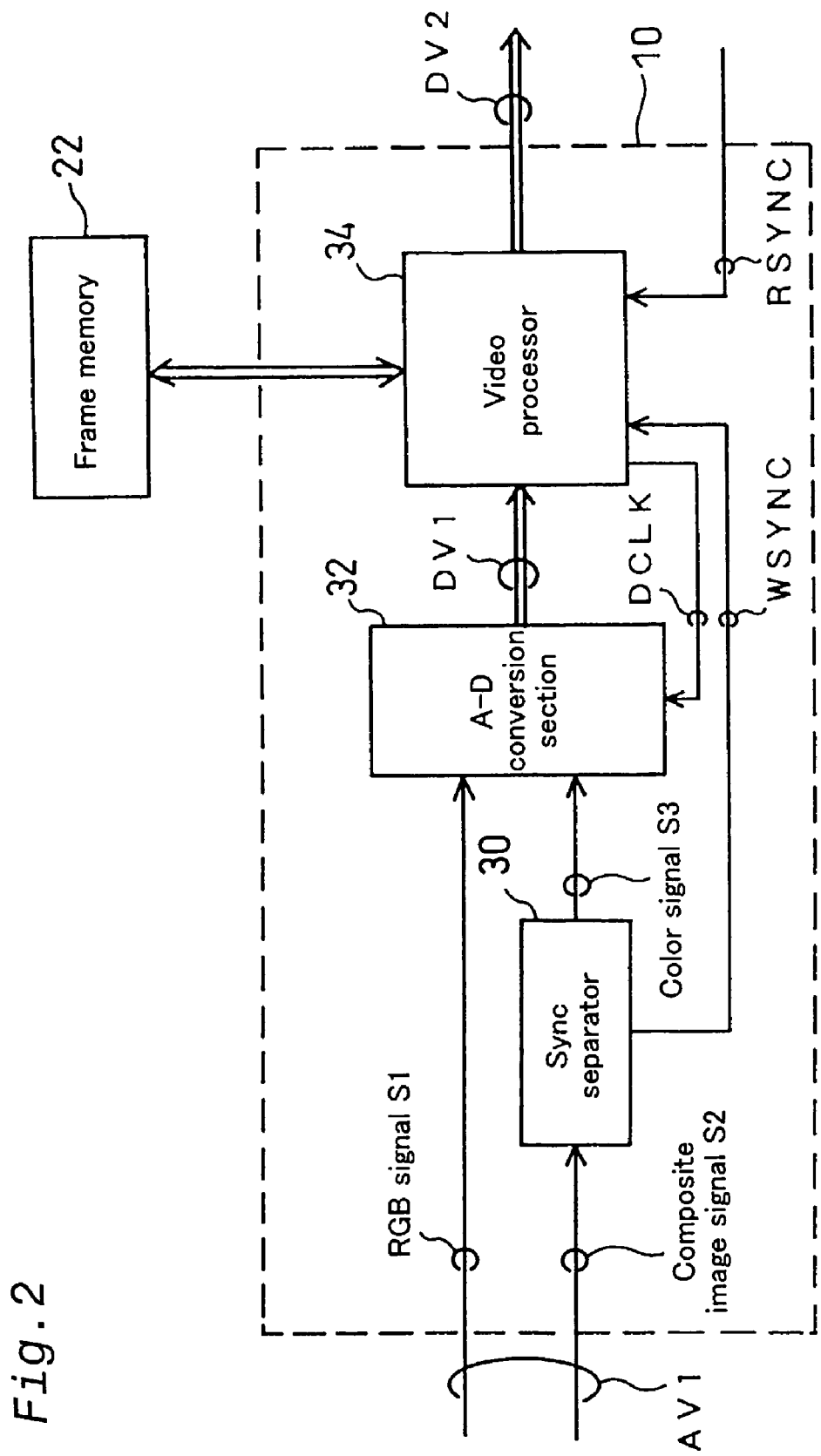
FIG. 2 is a block diagram for schematically illustrating the configuration of a video signal conversion circuit 10.

FIG. 2 is a block diagram for schematically illustrating the configuration of a video signal conversion circuit 10. The video signal conversion circuit 10 includes a sync separator 30, an A-D conversion section 32 and a video processor 34.

When the analog video signal AV1 is a composite image signal S2, the sync separator 30 separates the signal S2 into a sync signal SYNC and a component image signal (analog image signals not including a sync signal) S3. The component image signal S3 is comprised of three color signals representing the red, green and blue images. If the analog video signal AV1 that is received is an RGB signal S1, there is no need to use the sync separator 230 since there is a separate sync signal input.

The A-D conversion section 32 contains multiple A-D converters for converting RGB signals or component image signals output by the sync separator 30 to image data DV1 for each color signal. The conversion timing of the A-D converters is controlled by a dot clock DCLK generated in the video processor 34, using the sync signal WSYNC.

The video processor 34 performs various image processing functions such as controlling the input and output of image data to and from the frame memory 22. Image data DV1 from the A-D conversion section 32 is stored in the frame memory 22 until required.

The writing of image data to the frame memory 22 is synchronized by the sync signal WSYNC. Retrieval of image data from the frame memory 22 and processing of image data DV2 output by the video processor 34 are synchronized by a sync signal RSYNC output by the liquid crystal display driver circuit 14 (FIG. 1). The sync signals WSYNC and RSYNC are not mutually synchronized, although it is also possible to use sync signals WSYNC and RSYNC that are synchronized.

The video processor 34 includes a write control signal generator and a read control signal generator that are not illustrated. When image data is to be written to or read from the frame memory 22, the signal generators generate addresses and control signals for output to the frame memory 22. The image data is written to the frame memory 22 in accordance with the address and control signals generated by the write control signal generator, and the data is read out of the frame memory 22 in accordance with the address and control signals generated by the read control signal generator. Sync signal WSYNC or RSYNC is used when generating the addresses and control signals.

The embellishment effect memory 24 (FIG. 1) is used to store data representing embellishment images to be superimposed on original image data. In this embodiment, the embellishment data is stored in compressed form in the embellishment effect memory 24. Embellishment effect bitmap data expanded from the compressed embellishment data is stored in the embellishment effect bitmap memory 26.

Figure 3A:
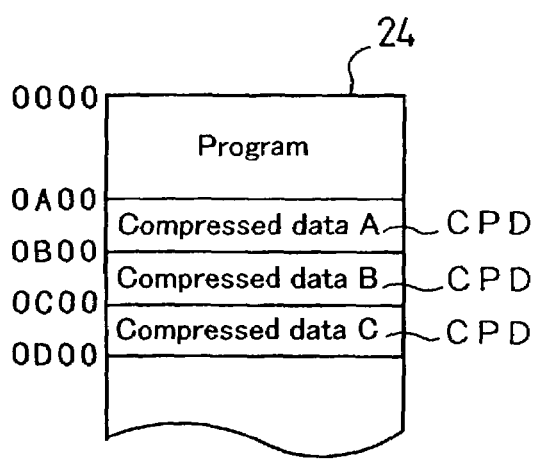
FIG. 3(a)-(c) are diagrams for explaining an embellishment effect memory 24, embellishment effect bitmap memory 26 and frame memory 22 used in the invention.
Figure 3B:
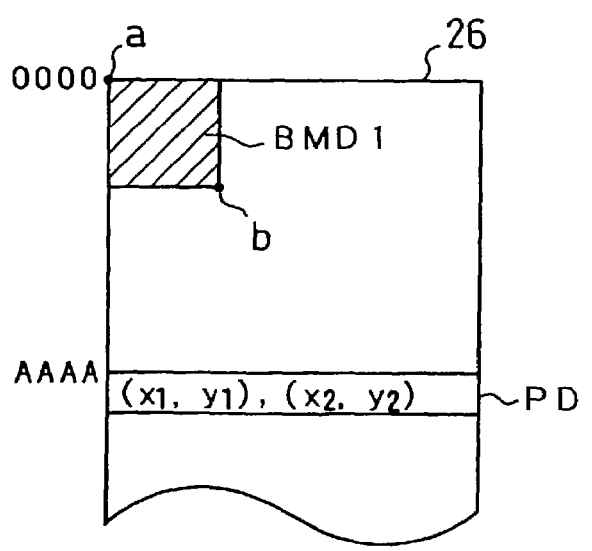
Figure 3C:
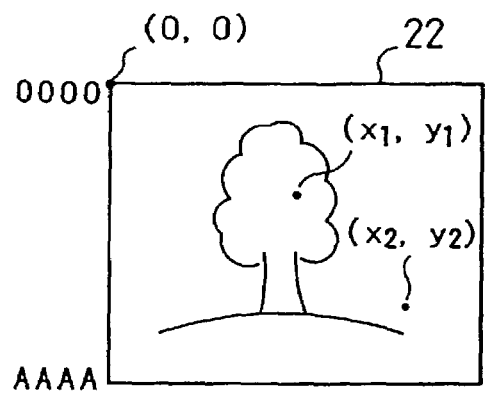

FIGS. 3(a)–(c) are diagrams for explaining an embellishment effect memory 24, embellishment effect bitmap memory 26 and frame memory 22 used in this embodiment. FIG. 3(a) shows the memory space in the embellishment effect memory 24, FIG. 3(b) shows the memory space in the embellishment effect bitmap memory 26 and FIG. 3(c) shows the memory space in the frame memory 22.

As shown, the embellishment effect memory 24 contains multiple types of compressed embellishment data CPD, and a program for expanding the compressed embellishment data CPD in a bitmap format. The program is stored in the embellishment effect memory 24 starting at memory address 0000. Compressed data A, B and C are stored at starting addresses 0A00, 0B00 and 0C00, respectively.

The embellishment effect bitmap memory 26 shown in FIG. 3(b) is used to store embellishment effect bitmap data BMD1 (representing a rectangular embellishment) expanded by the program in the embellishment effect memory 24, and coordinate data PD showing the overlay position and extent of embellishment images on the original image data. The embellishment effect bitmap data BMD1 (FIG. 3(b)) is expanded starting from address 0000 of the embellishment effect bitmap memory 26. The coordinate data PD is stored starting at address AAAA, and includes two point coordinates (x1, y1), (x2, y2). The first coordinate (x1, y1) denotes the overlay position of the embellishment image within the original image data, and the two coordinates (x1, y1), (x2, y2) denote the range of the embellishment overlay, meaning the size of the embellishment image overlay. In the frame memory 22, as shown in FIG. 3(c), one frame of original image data, a picture of a tree, is stored in a bitmap format. The coordinates (x1, y1), (x2, y2) shown in FIG. 3(c) correspond to coordinates (0, 0) in the address 0000 of the frame memory 22. These coordinates (x1, y1), (x2, y2) correspond to the coordinate data PD of FIG. 3(b). In FIG. 3(b), point a at the upper left of the embellishment effect bitmap data BMD1 corresponds to the coordinates (x1, y1), and point b at the lower right corresponds to the coordinates (x2, y2).

With respect to the embellishment effect bitmap data BMD1, any one of the multiple types of embellishment images can be expanded by specifying it. A user can also obtain coordinate data PD by specifying an overlay position within the image data, or an overlay position and overlay range. If just an overlay position is specified, coordinates (x1, y1) are determined, and the coordinate data (x2, y2) is set based upon predetermined sizes set according to the type of embellishment image concerned. When both position and range are specified, coordinates (x1, y1) are set according to the overlay position specified, and in accordance with the overlay range (size) specified, coordinates (x2+x, y2+y) are substituted for (x2, y2). This enables the embellishment image to be enlarged or reduced to any desired size. Coordinate data PD is discussed in further detail later. Although in this embodiment the embellishment effect bitmap data BMD1 and coordinate data PD are stored in the embellishment effect bitmap memory 26, they can instead be stored in the embellishment effect memory 24.

The embellishment overlay circuit 12 overlays original images and embellishment images. Specifically, the embellishment overlay circuit 12 overlays image data DV2 output by the video signal conversion circuit 10 and embellishment effect bitmap data BMD1 expanded in the embellishment effect bitmap memory 26.

Figure 4:
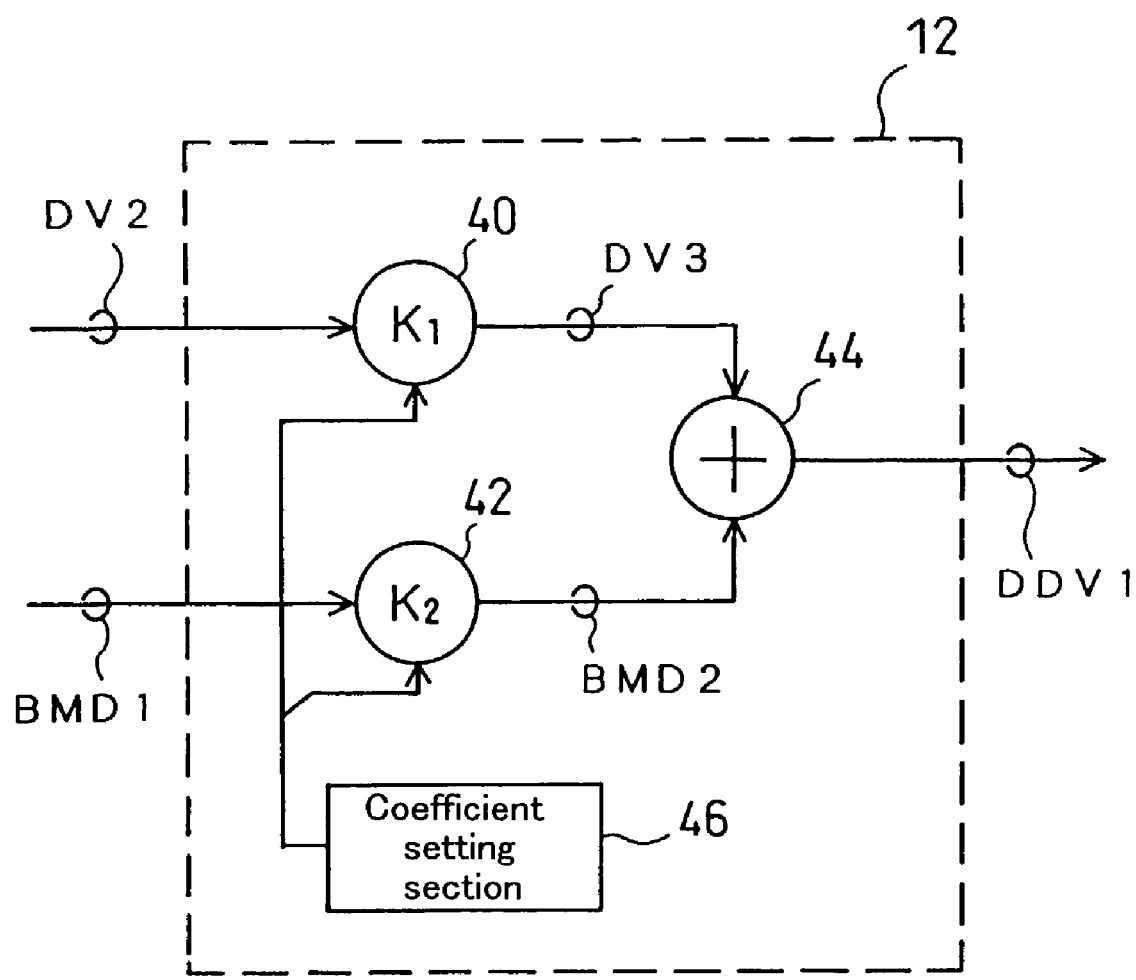
FIG. 4 is a block diagram for schematically illustrating the configuration of an embellishment overlay circuit 12.

FIG. 4 is a block diagram for schematically illustrating the configuration of the embellishment overlay circuit 12. The circuit 12 includes a pair of multipliers 40 and 42, one adder 44 and a coefficient setting section 46. The two multipliers 40 and 42 and the adder 44 constitute a configuration that is provided for each of the colors RGB. Image data DV2 output by the video processor 34 is input to the first multiplier 40, and the embellishment effect bitmap data BMD1 expanded in the embellishment effect bitmap memory 26 is input to the second multiplier 42.

The coefficient setting section 46 is used to set the coefficients k1 and k2 of the multipliers 40 and 42. Coefficients k1 and k2 can each be set to a value from 0 to 1. k1 and k2 are usually set at a value the sum of which is 1. The coefficients k1 and k2 are controlled by the coefficient setting section 46 based on the coordinate data PD (FIG. 3(b)).

The multipliers 40 and 42 are used to multiply original image pixel data by a constant factor. In the multiplier 40, the image data DV2 is converted to signals multiplied by k1. Similarly, embellishment effect bitmap data BMD1 is converted to signals multiplied by k2. The converted data output as image data DV3 and embellishment effect bitmap data BMD2 are input to the adder 44.

The adder 44 is used to add the pixel data of two input image signals. Thus, in the adder 44 the image data DV3 and the embellishment effect bitmap data BMD2 are added and output as embellished image data DDV1. In the projection display apparatus according to this first embodiment, the multipliers 40 and 42, adder 44 and coefficient setting section 46 correspond to the synthesizer section in the first projection display apparatus of this invention.

The embellished image data DDV1 output by the embellishment overlay circuit 12 is supplied to the liquid crystal display driver circuit 14 (FIG. 1). The liquid crystal display driver circuit 14 displays on the liquid crystal display panel 16 the image with the embellishment overlay corresponding to the embellished image data DDV1. The image displayed on the liquid crystal display panel 16 is projected onto the projection screen 104 by the optical systems 100 and 102. More specifically, light incident onto the liquid crystal display panel 16 by the illumination optical system 100 is modulated in accordance with image data supplied to the liquid crystal display panel 16, and the light exiting from the liquid crystal display panel 16 is projected onto the projection screen 104 by the projection optical system 102. The liquid crystal display panel 16 corresponds to the light modulation unit in the first projection display apparatus of this invention.

The projection display apparatus is controlled by the remote control section 28 in accordance with commands from the remote controller 29. What the remote control section 28 controls is mainly processing related to embellishment effects. In accordance with commands received from the remote controller 29, this includes selecting the type of embellishment image and controlling the overlay position and size of embellishment images, and whether embellishment images are displayed or not.

Instead of hardware, the functions of the video signal conversion circuit 10, embellishment overlay circuit 12 and remote control section 28 can be realized by a computer program. The computer program for realizing the functions of these parts can be provided in a format recorded on a computer-readable recording medium such as floppy disk, CD-ROM or the like. The program is read off the recording medium by the computer (projection display apparatus) and transferred to an internal storage device or an external storage device. Alternatively, the computer program may be supplied from a program supply apparatus via a communication route. When realizing the computer functions, a computer program stored in an internal storage device is executed by the computer CPU (microprocessor). A computer program recorded on a recording medium can also be executed directly by the computer.

As used in this specification, "computer" includes hardware and an operating system, with the hardware being operated under the control of the operating system. If the hardware is operated by an application program having no need of an operating system, then the hardware itself will constitute the computer. The hardware comprises at least a microprocessor like a CPU and means for reading a program recorded on a recording medium. For this purpose, the computer program includes program code for realizing the function of each of the means described in the foregoing. Some of the functions can be implemented by the operating system instead of an application program.

The recording media in this invention include floppy disks, CD-ROM disks, opto-magnetic disks, IC cards, ROM cartridges, punched cards, bar codes and other such printed symbols, internal storage devices (including RAM and ROM) and external storage devices.

Figure 5:
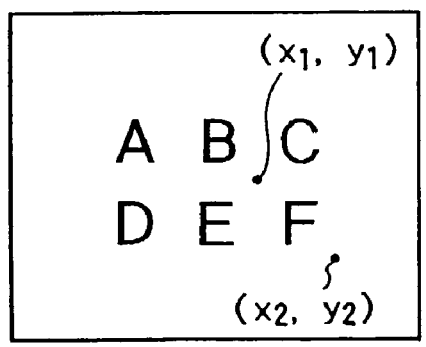
FIG. 5(a)-(c) are diagrams for explaining the overlay operation of image data stored in the frame memory 22 and embellishment effect bitmap data BMD1 stored in the embellishment effect bitmap memory 26.
Figure 5:
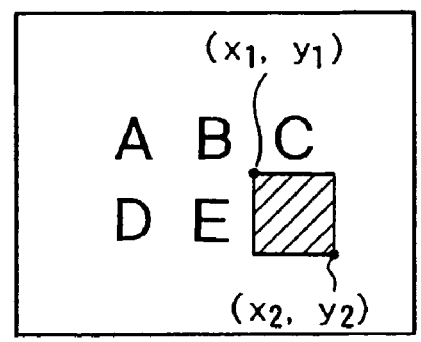
Figure 5:
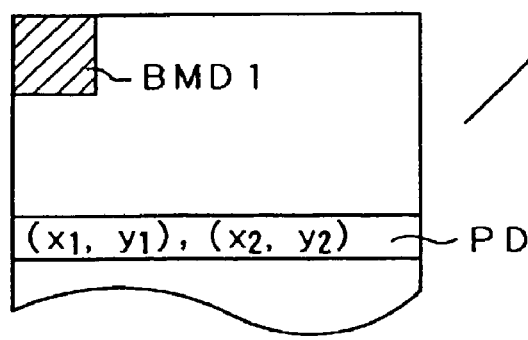

FIG. 5(a)-(c) are diagrams for explaining the overlay operation of image data stored in the frame memory 22 and embellishment effect bitmap data BMD1 stored in the embellishment effect bitmap memory 26. FIG. 5(a) shows the memory space of the frame memory 22, containing text image data. FIG. 5(b) shows the memory space of the embellishment effect bitmap memory 26, containing embellishment effect bitmap data BMD1 (a rectangular figure) and coordinate data PD showing the position and extent of the overlay. The (x1, y1), (x2, y2) of the coordinate data PD in FIG. 5(b) correspond to the coordinates (x1, y1), (x2, y2) of FIG. 5(a). FIG. 5(c) shows the embellished image data DDV1 consisting of the original image data overlaid with the embellishment effect bitmap data BMD1.

The overlaying of the image data and embellishment effect bitmap data BMD1 is effected based on the coordinate data PD. In the embellishment overlay circuit 12, the stream of image data is input to the first multiplier 40, while the second multiplier 42 receives only the embellishment effect bitmap data BMD1 for the portion defined by the coordinates (x1, y1) and (x2, y2), which is the overlay portion. The timing of the input of the embellishment effect bitmap data BMD1 to the multiplier 42 is controlled by the CPU 20 based on the coordinate data PD. Simultaneously with the input of the embellishment effect bitmap data BMD1 to the multiplier 42, the coefficients k1 and k2 of the multipliers 40 and 42 are modified. When the embellishment effect bitmap data BMD1 is not being input to the multiplier 42, k1 and k2 are set to (1, 0). When the embellishment effect bitmap data BMD1 is being input to the multiplier 42, k1 and k2 are set to (0, 1). As a result, with respect to pixels not in the area defined by the coordinate data (x1, y1) and (x2, y2), the original image data (text) shown in FIG. 5(a) is output by the embellishment overlay circuit 12, while with respect to the pixels within the range defined by the coordinates (x1, y1), (x2, y2), the embellishment effect bitmap data BMD1 shown in FIG. 5(b) is output by the embellishment overlay circuit 12. In this way, the embellishment effect bitmap data BMD1 is superimposed on the original image data, forming the embellished image data DDV1 representing the embellishment image shown in FIG. 5(c).

Figure 6:
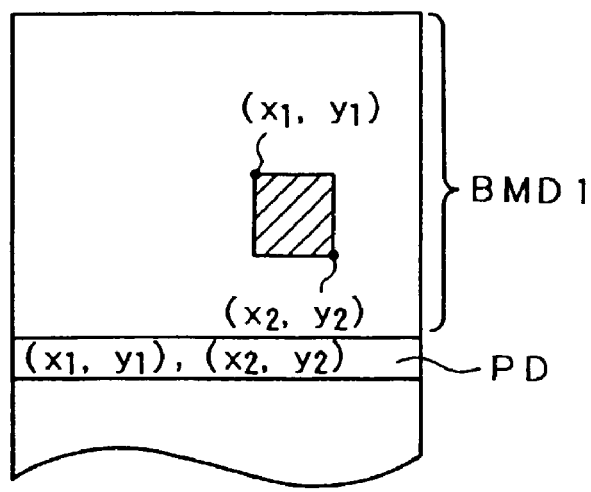
FIG. 6 is a diagram for explaining the embellishment effect bitmap data BMD1 expanded in the embellishment effect bitmap memory 26.

The embellishment images can be expanded in the embellishment effect bitmap memory 26 to correspond with the overlay position within the image data. FIG. 6 is a diagram for explaining the embellishment effect bitmap data BMD1 expanded in the embellishment effect bitmap memory 26. A portion of the embellishment effect bitmap memory 26 corresponding to one frame of image data is allocated for expanding the embellishment image, which is expanded at the location defined by the coordinates (x1, y1), (x2, y2). When the expansion takes place as shown in FIG. 6, pixel data of the image data and embellishment effect bitmap data BMD1 corresponding to the same position in the image are input simultaneously to the respective multipliers 40 and 42. At this time, for areas outside the area defined by the coordinate data PD coordinates (x1, y1) and (x2, y2), the coefficients (k1, k2) are set to (1, 0), while inside the range of the coordinates (x1, y1) and (x2, y2), coefficients (k1, k2) are set to (0, 1). In this way, the original image data can be overlaid with the embellishment effect bitmap data BMD1, producing the embellished image data DDV1 representing the embellishment image of FIG. 5(c).

Thus, when the embellishment image is expanded as shown in FIG. 6, enough memory capacity for one frame is required for the embellishment effect bitmap data BMD1. However, if the embellishment image is expanded as shown in FIG. 5(b), it is only necessary to have enough memory space to accommodate the size of the expanded embellishment effect bitmap data, meaning it is possible to get by with a smaller memory capacity.

Figure 7A:
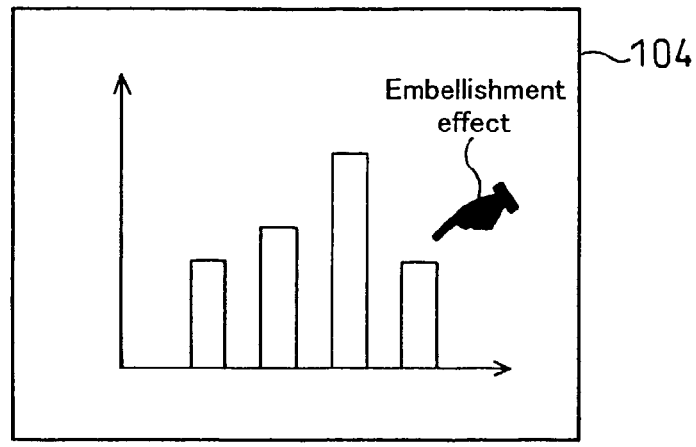
FIG. 7(a)-(c) are diagrams for explaining examples of displays on a projection screen 104 of original images input from a personal computer that have been overlaid with embellishment images.
Figure 7B:
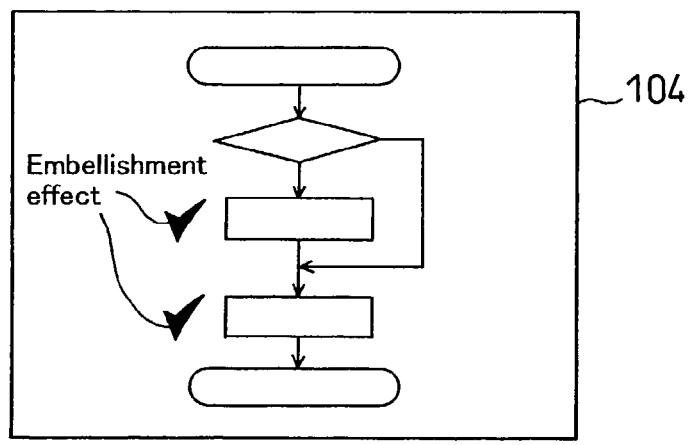
Figure 7C:
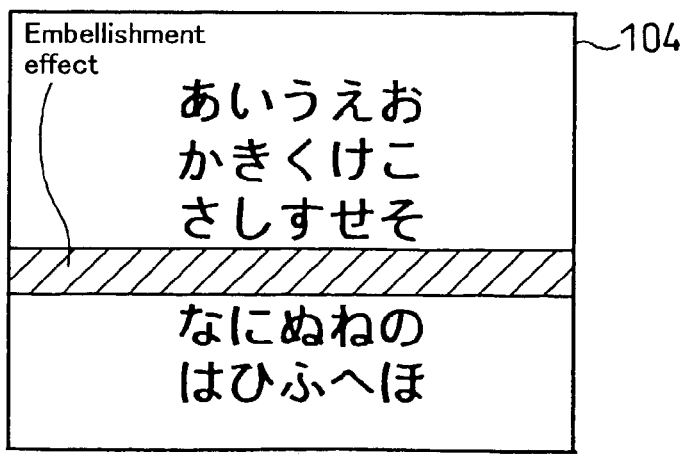

FIG. 7(a)-(c) are diagrams for explaining examples of displays on a projection screen 104 of original images input from a personal computer that have been overlaid with embellishment images. FIG. 7(a) shows a bar graph as the original image, embellished with a pointing finger image. FIG. 7(b) shows a flow chart embellished with check marks, and FIG. 7(c) shows text with a horizontal line superimposed.

Figure 8A:
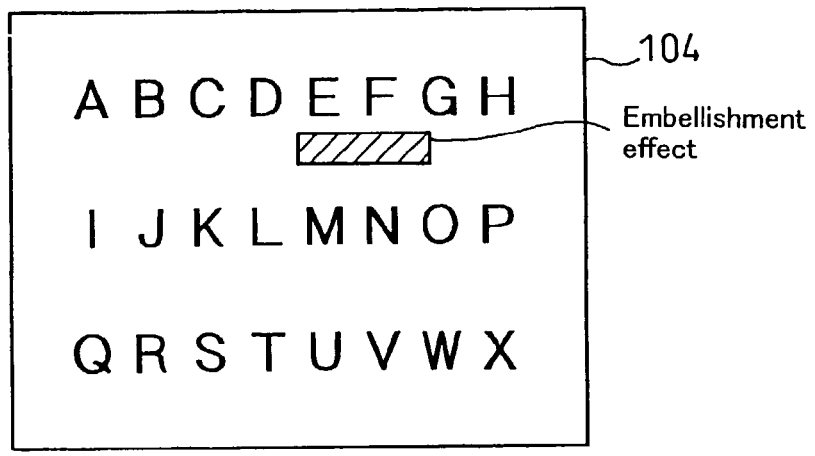
FIG. 8(a)-(c) are another diagrams for explaining the displays on a projection screen 104 of original images input from a personal computer that have been overlaid with embellishment images.
Figure 8B:
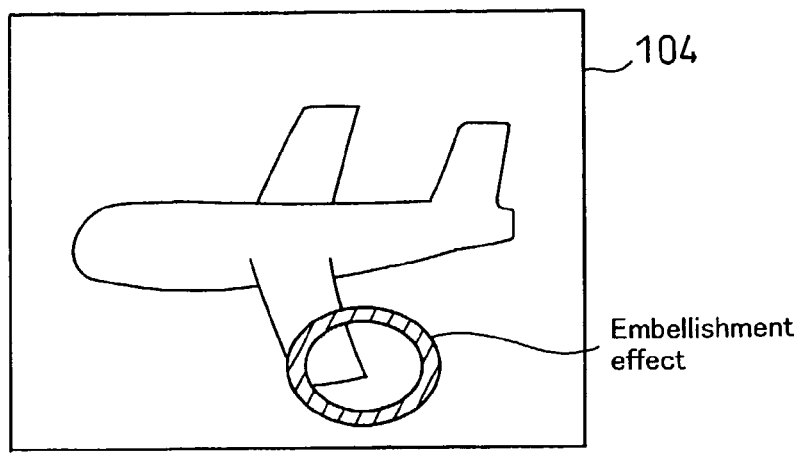
Figure 8C:
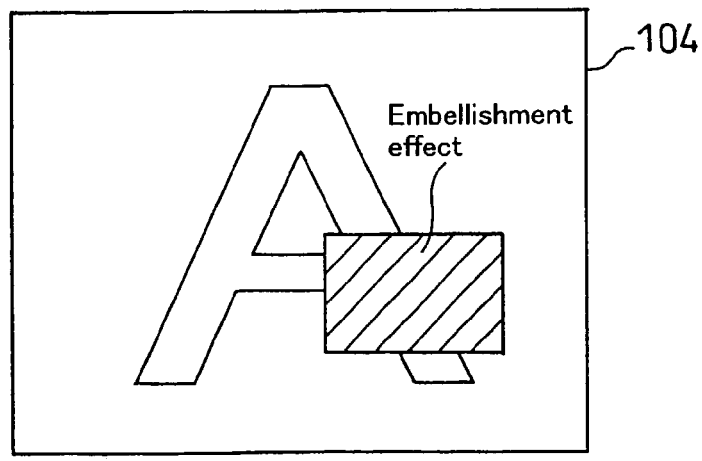

FIG. 8(a)-(c) are another diagrams for explaining the displays on a projection screen 104 of original images input from a personal computer that have been overlaid with embellishment images. FIG. 8(a) shows text overlaid with a marker. FIG. 8(b) shows a picture of an airplane overlaid with an oval. FIG. 8(c) shows a letter A overlaid with a rectangle.

The coordinate data PD includes only two point coordinates showing the overlay position and extent of the embellishment image. To use the type of overlay shown in FIGS. 7(a) and 7(b), and FIG. 8(b), the part of the area defined by the two point coordinates where there is no embellishment figure is processed so that no overlay is effected there.

Figure 9:
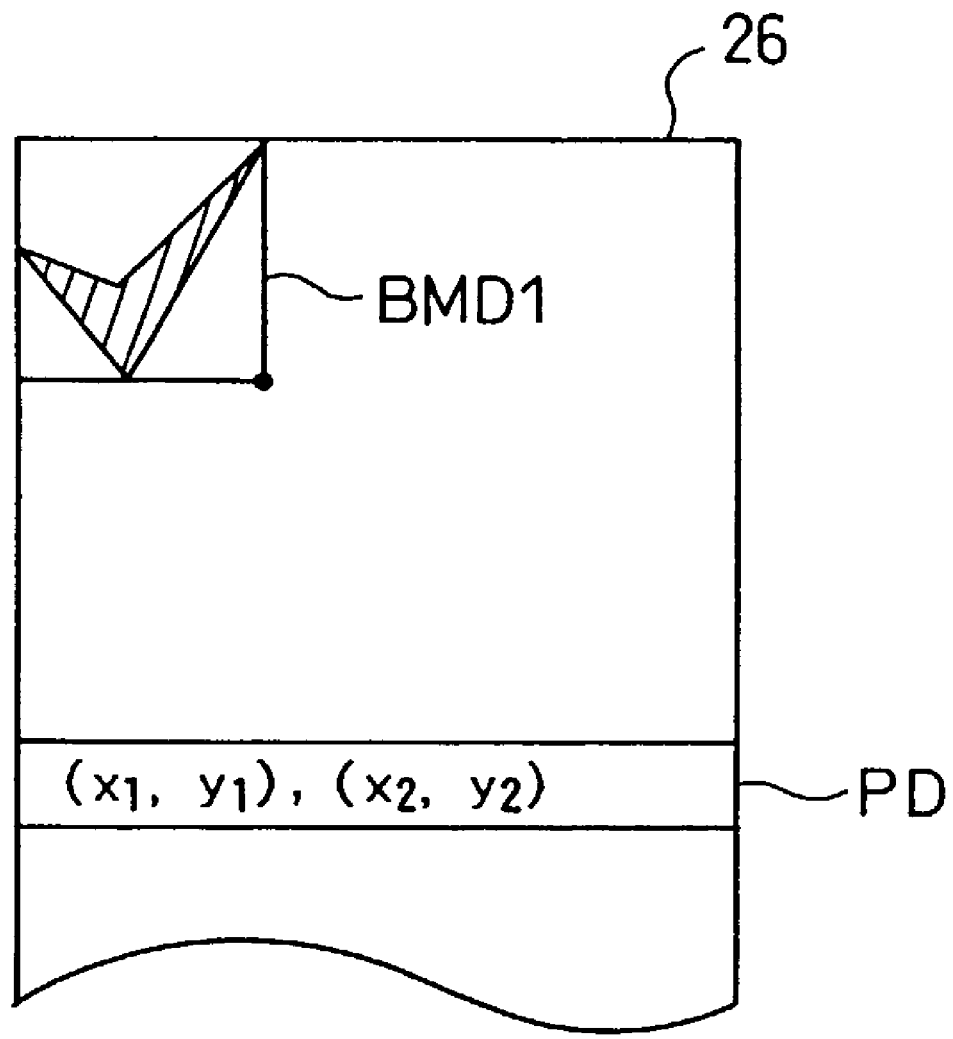
FIG. 9 is a diagram for explaining the embellishment effect bitmap memory 26 when the embellishment images of FIG. 7(b) are being expanded.

FIG. 9 is a diagram for explaining the embellishment effect bitmap memory 26 when the embellishment images of FIG. 7(b) are being expanded. Only the part of the embellishment effect bitmap data BMD1 that forms the check mark is superimposed on the original image. The pixels that do not form that part of the overlay are comprised of designated pixel data. For example, all the bits of the RGB pixel data could be expanded as 0s. The embellishment effect bitmap data BMD1 could be input to the coefficient setting section 46 and the data examined to determine whether there are pixels where there are no embellishment figures. When there are such pixels, the coefficients (k1, k2) applied to the multipliers 40 and 42 can be adjusted to (1, 0). Doing this enables just the figure part of the embellishment effect bitmap data to be superimposed on the original image. The coordinate data PD can of course be comprised of multiple point coordinates around the portion with the embellishment figure, in which case it would only be necessary to use the coordinate data PD to overlay just the embellishment figure portion.

The embellishment images (a pointer, a horizontal line or the like) shown in FIG. 7(a)-(c) are superimposed at specified locations within the projection images. Here, the coordinate data PD comprises coordinates (x1, y1) that indicate the specified position and coordinates (x2, y2) that determine the size of each preset embellishment image. The embellishment images (a marker, a oval, a rectangle or the like) shown in FIG. 8(a)-(c) are superimposed by specifying the overlay position and extent within the projection images. In this case, the coordinate data PD comprises the preset coordinates (x1, y1) and the coordinates (x2, y2) corresponding to the specified size. The embellishment images are not limited to those shown in FIGS. 7(a)–(c) and 8(a)–(c) and any type of figure can be used as the embellishment images. If the embellishment images used are the sort shown in FIG. 8(a)-(c), a drawing program could be used to create the bitmap data instead of pre-storing the embellishment images in the embellishment effect memory 24. Thus, the remote controller 29 could be used to overlay the embellishment by writing the bitmap data of the figure thus drawn into the embellishment effect bitmap memory 26. Thus, the embellishment images used to overlay the image data are not limited to the images stored in the embellishment effect memory 24. Moreover, using the drawing program also enables a user to use the remote controller 29 to create embellishment images of any desired shape such as free-form curve for overlay purposes.

Also, since the embellishment effect bitmap data BMD1 includes the coordinate data PD indicating the overlay position, an embellishment image can be displayed at any point that is specified with the remote controller 29. The embellishment effect bitmap data BMD1 and the coordinate data PD are being constantly updated in sync with the sync signal RSYNC, so the remote controller 29 can be used to move an embellishment image to any point within the projection image, on a realtime basis. Moreover, multiple embellishment images of any type can be displayed, as shown in FIG. 7(b), and the images fixed in position. A command issued by the remote controller 29 and received by the remote control section 28 can be used to execute the program in the embellishment effect memory 24 to generate the embellishment effect bitmap data BMD1.

In the examples shown in FIGS. 7(a)–(c) and 8(a)–(c), the embellishment images appear to be blocked in on the original image. The overlay effect can be obtained by substituting the embellishment effect bitmap data for part of the original image data. In the embellishment overlay circuit 12 (FIG. 4), the coefficients (k1, k2) are set at (1, 0) for those portions where no embellishment is added, while the coefficients (k1, k2) are set at (0, 1) for portions where an embellishment is added.

Transparent embellishments can be added by modifying k1 and k2. Setting both k1 and k2 to 1/2, for example, would provide this transparent effect.

Figure 10:
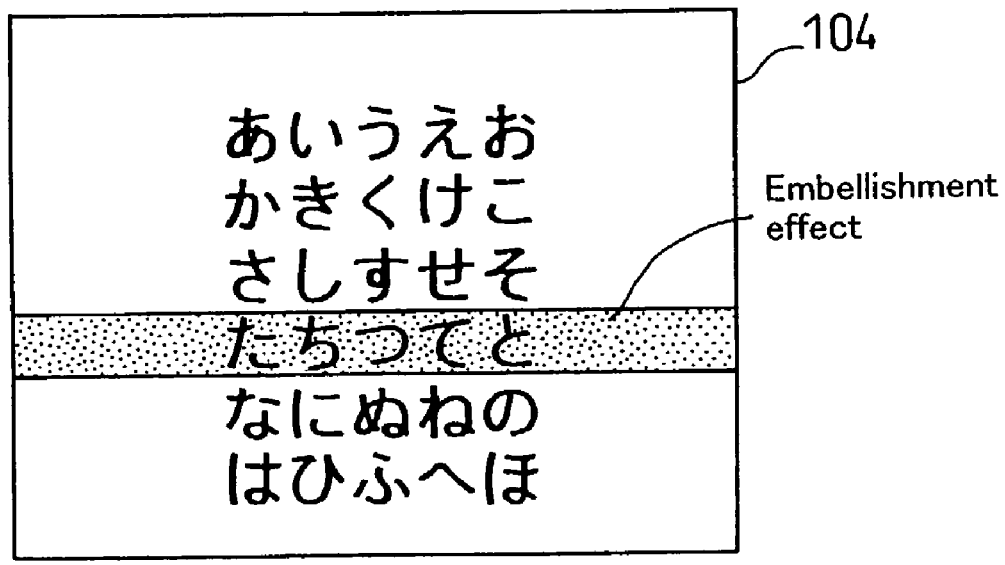
FIGS. 10(a) and 10(b) are diagrams for explaining projected images overlaid with transparent embellishments.
Figure 10:
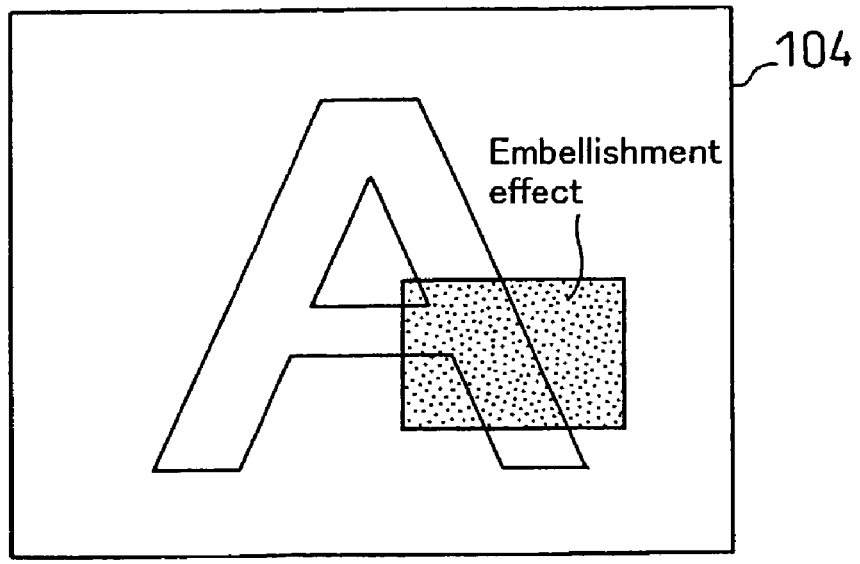

FIGS. 10(a) and 10(b) are diagrams for explaining projected images overlaid with transparent embellishments. FIG. 10(a) is a projection image showing the embellishment of FIG. 7(c) used as a transparent overlay. Similarly, FIG. 10(b) is a projection image showing the embellishment of FIG. 8(c) used as a transparent overlay. These show how transparent embellishments can be achieved by setting the coefficients k1, k2 of the multipliers 40 and 42 in the circuit 12 (FIG. 4) to 1/2.

The embellishment effects shown in FIGS. 7(a)–(c), 8(a)–(c) and 10(a)–(b) were obtained using k1, k2 set at a fixed 0, 1 and 1/2. However, k1 and k2 values can be used that change with time. For example, for portions where an embellishment effect is added, the coefficients (k1, k2) can start off set at (0, 1) and, as time passes, can be gradually changed thus: (0.1, 0.9), (0.2, 0.8) . . . (1, 0). As a result, the embellishment would start out looking solid, then would gradually become transparent, and would end up disappearing. By changing the coefficients k1 and k2, such embellishment effects can be obtained. The modification of the coefficients is effected by the coefficient setting section 46 based on commands from the CPU 20.

When part of the image is displayed enlarged, the display position can be modified along with the modification of the part that is enlarged.

Figure 11A:
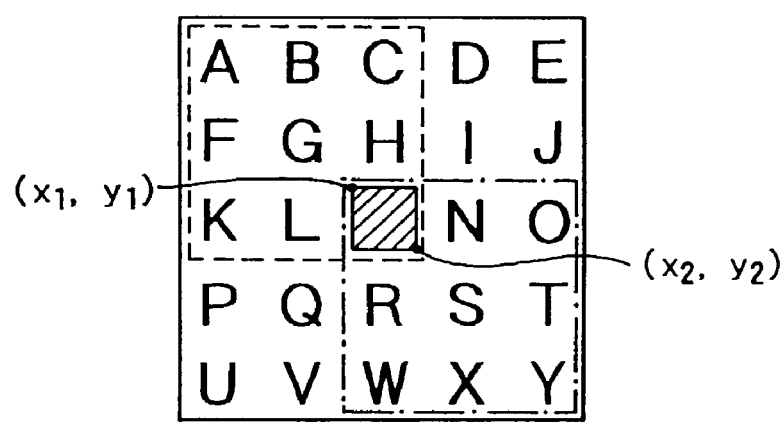
FIG. 11(a)-(c) are diagrams for explaining the positioning of embellishment images when part of the image is enlarged.
Figure 11B:
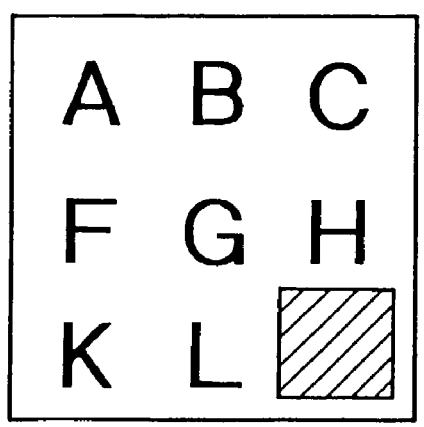
Figure 11C:
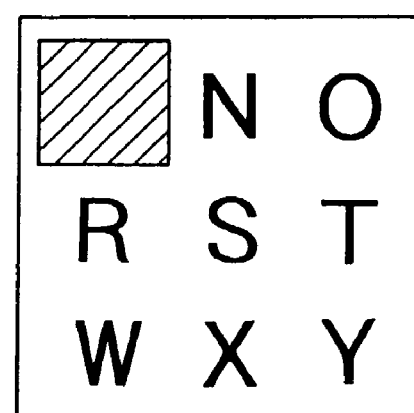

FIG. 11(a)-(c) are diagrams for explaining the positioning of embellishment images when part of the image is enlarged. FIG. 11(a) is a projection image showing one frame of the original image (letters of the alphabet) overlaid with a square embellishment image. In FIG. 11(a), the embellishment square is in the center of the image, covering the letter M. FIG. 11(b) is an enlargement of the portion in FIG. 11(a) defined by the dashed line. As shown, the embellishment overlays the letter M. FIG. 11(c) is an enlargement of the portion of FIG. 11(a) defined by the dot-dash line. As shown in FIG. 11(c), even when the part displayed enlarged is changed, the embellishment still overlays the letter M position.

When the type of image enlargement shown in FIGS. 11(b) and 11(c) is used, only the pixels of the enlarged portion are read out of the frame memory 22 and embellishment effect bitmap memory 26. In the case of FIG. 11(b), for example, just the original image data of the portion shown within the dashed line in FIG. 11(a) is read out of the frame memory 22 and input to the multiplier 40. When reading out the pixel data corresponding to the portion of the original image within the area defined by the coordinates (x1, y1), (x2, y2), the pixel data corresponding to the embellishment effect bitmap data BMD1 is read out of the embellishment effect bitmap memory 26 and input to the multiplier 42. With respect to portions outside the area defined by the coordinates (x1, y1), (x2, y2), the coefficients (k1, k2) of the multipliers 40 and 42 are set at (1, 0), and at (0, 1) for areas within the said coordinates. The part to be enlarged can be specified using the remote controller. In this way, an image can be obtained comprising an embellishment image superimposed on a specified part of the original image. The enlargement within the specified area by controlling the readout of enlargement portion pixels in accordance with the enlargement factor. Specifically, an enlarged image of the specified portion can be obtained by reading out the pixels of all or part of the enlargement portion multiple times. Even when the enlargement portion changes, as in FIG. 11(c), the enlarged image can be obtained by reading out the pixels of the area within the dot-dash line.

As described, an enlarged image can be displayed by overlaying the original image within the specified area with an embellishment image based on the coordinate data PD, so the overlay position of the embellishment can be modified as the enlarged portion that is to be displayed is changed.

The embellishment overlay circuit 12, embellishment effect bitmap memory 26 and frame memory 22 correspond to the image embellishment section and image overlay section in the first projection display apparatus of this invention.

B. Second Embodiment

Figure 12:
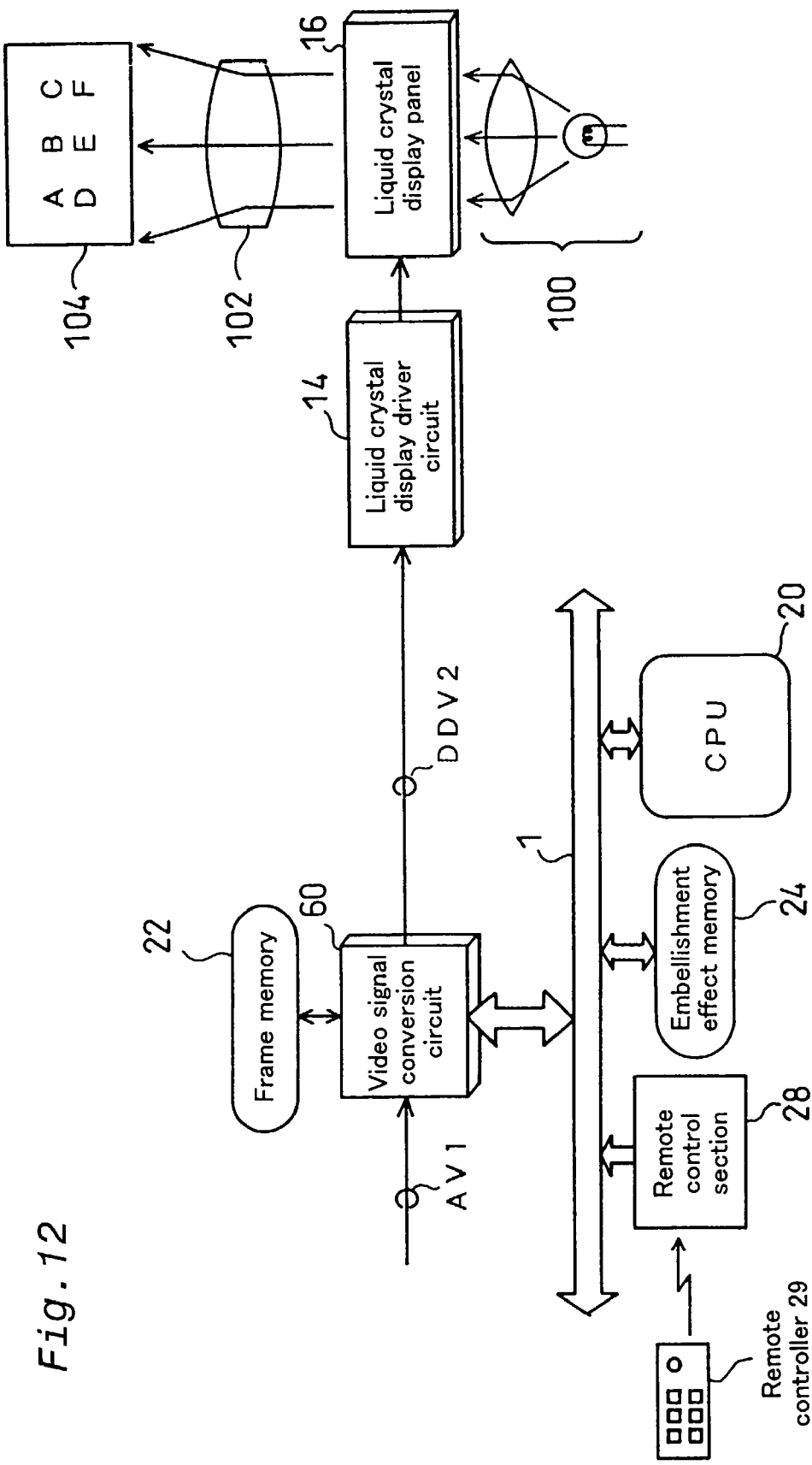
FIG. 12 is a block diagram for schematically illustrating the general configuration of a projection display apparatus that is a second embodiment of this invention.

FIG. 12 is a block diagram for schematically illustrating the general configuration of a projection display apparatus that is a second embodiment of this invention. The projection display apparatus includes a video signal conversion circuit 60, a liquid crystal display driver circuit 14, a liquid crystal display panel 16, a frame memory 22, an embellishment effect memory 24, a remote control section 28, a CPU 20, an illumination optical system 100 and a projection optical system 102. The video signal conversion circuit 60, embellishment effect memory 24, remote control section 28 and CPU 20 are connected to each other via a bus 1. The liquid crystal display driver circuit 14 is also connected to the bus 1, but the connection is not shown in FIG. 12.

The projection display apparatus of this second embodiment does not have the embellishment overlay circuit 12 or the embellishment effect bitmap memory 26 possessed by the first embodiment (FIG. 1). The video signal conversion circuit 60 is used to overlay embellishment images on the original image. Embellishment effect bitmap data is stored in the embellishment effect memory 24. Thus, the video signal conversion circuit 60, frame memory 22 and embellishment effect memory 24 correspond to the image embellishment section and image overlay section in the first projection display apparatus of this invention.

Figure 13:
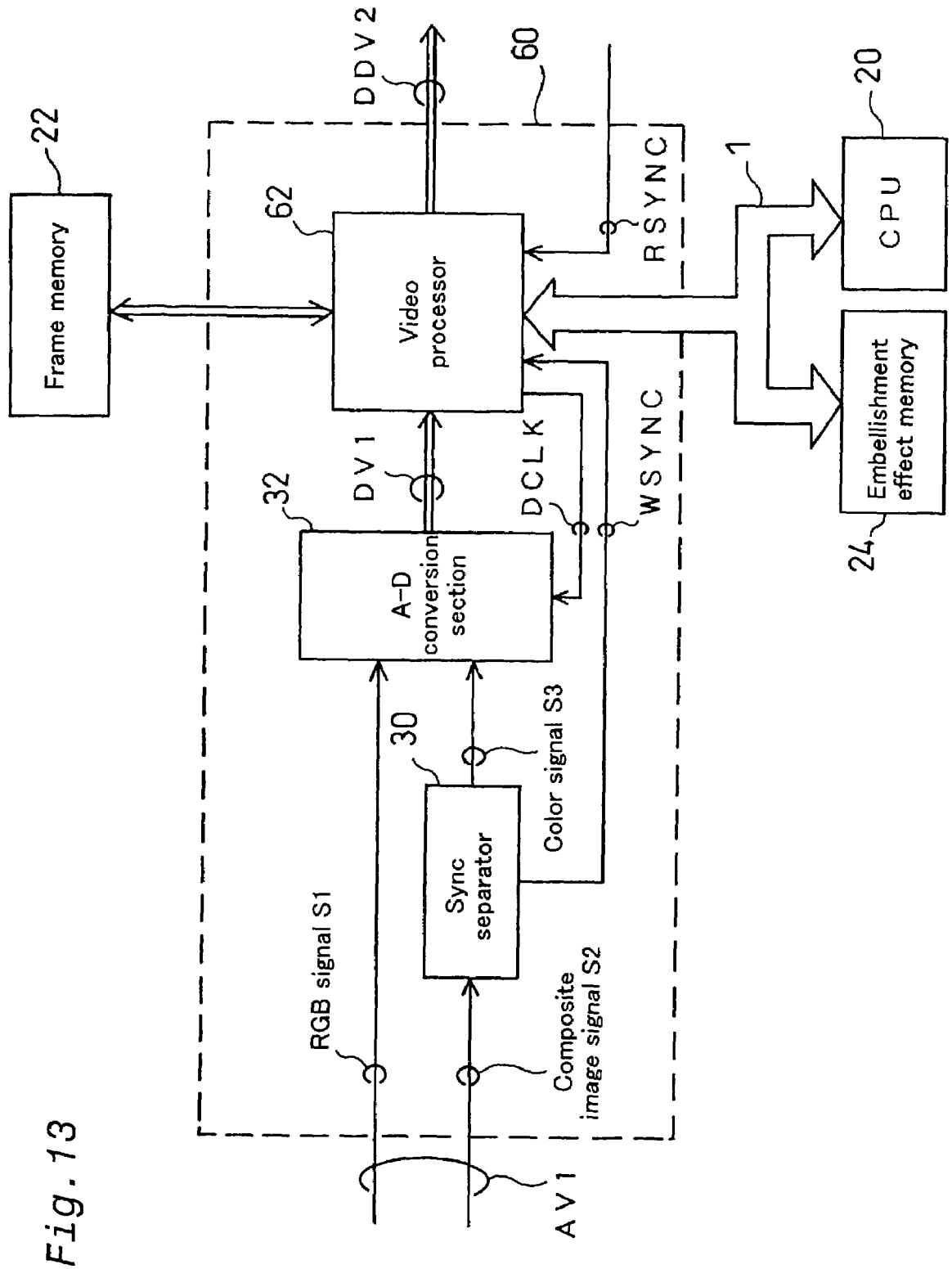
FIG. 13 is a block diagram for schematically illustrating the configuration of a video signal conversion circuit 60.

FIG. 13 is a block diagram for schematically illustrating the configuration of the video signal conversion circuit 60. The video signal conversion circuit 60 includes a sync separator 30, an A-D conversion section 32 and a video processor 62. The sync separator 30 and A-D conversion section 32 have the same functions as in the first embodiment, so further explanation thereof is omitted.

The video processor 62 is a microprocessor that performs overlay processing of the original image data and embellishment effect bitmap data, and controls the input and output of image data to and from the frame memory 22.

The image data DV1 output by the A-D conversion section 32 and the embellishment effect bitmap data BMD1 expanded in the embellishment effect memory 24 are input to the video processor 62, which uses this input to generate embellished image data and writes the data into the frame memory 22.

The writing of the embellished image data to the frame memory 22 is synchronized by the sync signal WSYNC. The readout of the embellished image data from the frame memory 22 is synchronized by a sync signal RSYNC output by the liquid crystal display driver circuit 14 (FIG. 12). The sync signals WSYNC and RSYNC are not mutually synchronized, although it is also possible to use sync signals WSYNC and RSYNC that are synchronized.

The video processor 62 includes a write control signal generator and a read control signal generator (not shown). When the embellished image data is to be written to or read from the frame memory 22, the signal generators generate addresses and control signals that are supplied to the frame memory 22. The embellished image data is written to the frame memory 22 in accordance with the address and control signals generated by the write control signal generator, and the data is read out of the frame memory 22 in accordance with the address and control signals generated by the read control signal generator. Sync signal WSYNC or RSYNC is used when generating the addresses and the control signals.

In the video processor 62 the embellished image data is produced by selecting the image data DV1 and the embellishment effect bitmap data BMD1 and the data is written into the frame memory 22. A data selector in the video processor 62 is used to select the image data DV1 and embellishment effect bitmap data BMD1.

Figure 14:
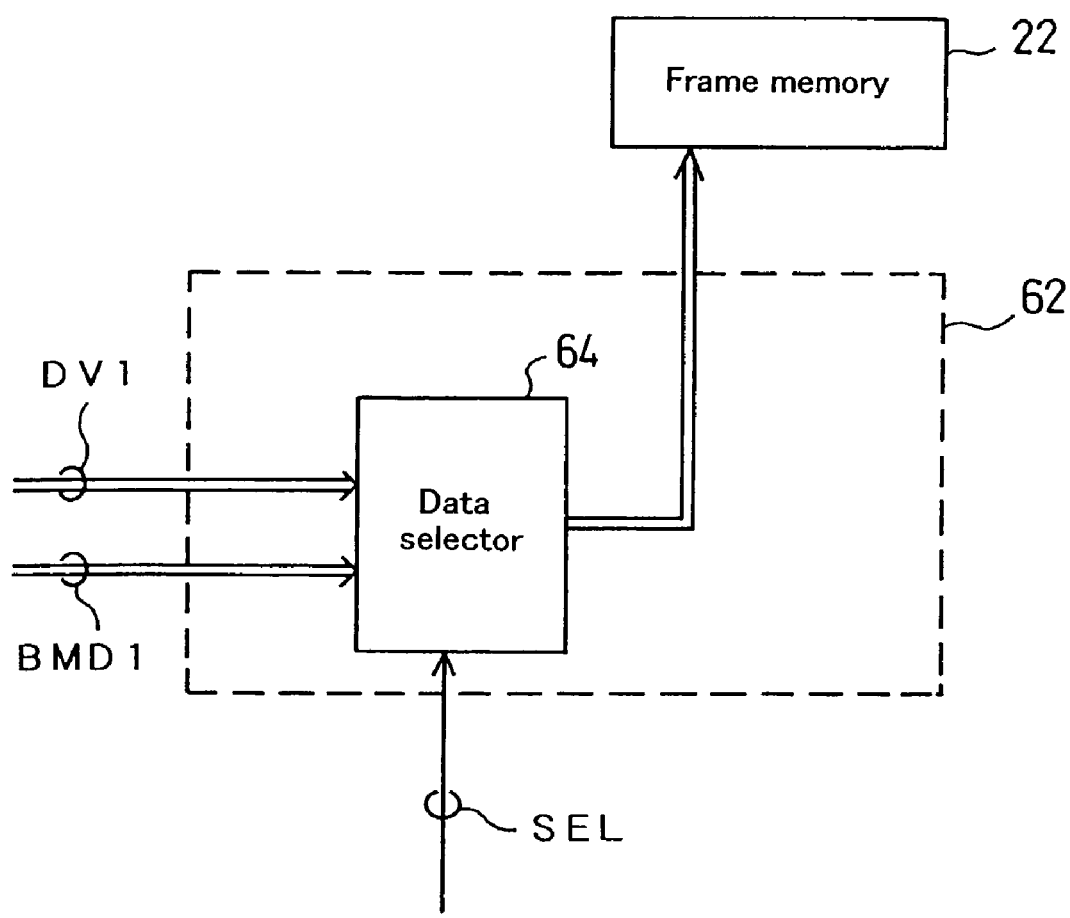
FIG. 14 is a diagram for explaining a data selector 64 of a video processor 62.

FIG. 14 is a diagram for explaining the data selector 64 of the video processor 62. A data selector 64 is provided for each of the RGB colors. Image data DV1 and embellishment effect bitmap data BMD1 are input to the data selector 64, along with a selection signal SEL. The selection of the image data DV1 and embellishment effect bitmap data BMD1 is done on a pixel data by pixel data basis and controlled by the selection signal SEL. Thus, under the control of the selection signal SEL, the data selector 64 selects either image data DV1 pixel data or embellishment effect bitmap data BMD1 pixel data and writes the data into the frame memory 22. Therefore, the data written into the frame memory 22 becomes the embellished image data of the original image overlaid with the embellishment image. The selection signal SEL is generated by the CPU 20 based on the coordinate data PD.

In this embodiment the embellishment images appear to be blocked in on the original image. This corresponds to when in the first embodiment the coefficients (k1, k2) of the multipliers 40 and 42 are set at (0, 1) with respect to the embellishment image overlay portion.

When embellishment effect bitmap data BMD1 is expanded as shown in FIG. 5(b), only the embellishment effect bitmap data BMD1 for the area defined by the coordinate data PD coordinates (x1, y1) and (x2, y2) is input to the data selector 64. The timing of the input of the embellishment effect bitmap data BMD1 to the data selector 64 is controlled by the CPU 20 based on the sync signal WSYNC and the coordinate data PD. Specifically, the timing of the input of the embellishment effect bitmap data BMD1 is determined by using coordinate data PD of the embellishment effect bitmap data BMD1 to obtain the input timing of the pixel data of the image data DV1 for the overlay position. Simultaneously with the input of the embellishment effect bitmap data BMD1, the embellishment effect bitmap data BMD1 is selected by the selection signal SEL. In this way, a selection between image data DV1 and embellishment effect bitmap data BMD1 can be made with respect to each pixel assigned to the same position in the image.

When the embellishment effect bitmap data BMD1 is expanded as shown in FIG. 6, pixel data of the image data DV1 and embellishment effect bitmap data BMD1 corresponding to the same position in the image are input simultaneously to the data selector 64. The input pixel data is specified based on the sync signal WSYNC. Thus, pixel data can be assigned to the same position in the original image by synchronizing the readout of the embellishment effect bitmap data BMD1 from the embellishment effect memory 24 with the input of the image data DV1 to the video processor 62. Also, the embellishment image can be superimposed on the original image by using the coordinate data PD as a basis for supplying the selection signal SEL to the data selector 64.

In this embodiment the embellished image data can be obtained by writing directly to the frame memory 22. The embellished image data written to the frame memory 22 is read out by the video processor 62.

Embellished image data DDV2 output by the video signal conversion circuit 60 is supplied to the liquid crystal display driver circuit 14 (FIG. 12). The liquid crystal display driver circuit 14 displays on the liquid crystal display panel 16 the image with the embellishment overlay corresponding to the embellished image data DDV2. The image displayed on the liquid crystal display panel 16 is projected onto the projection screen 104 by the optical system 100 and 102.

In the first and second embodiments described in the foregoing, embellishment images can be superimposed on an original image within the projection display apparatus. This means it is possible to overlay an embellishment image on an image signal output by a personal computer, video recorder or TV. Moreover, by using the coordinate data PD, an embellishment image can be superimposed at any desired location within the image data, and the embellishment images can be enlarged or reduced.

C. Third Embodiment

C-1. Configuration and Operation of the Projection Display Apparatus

Figure 15:
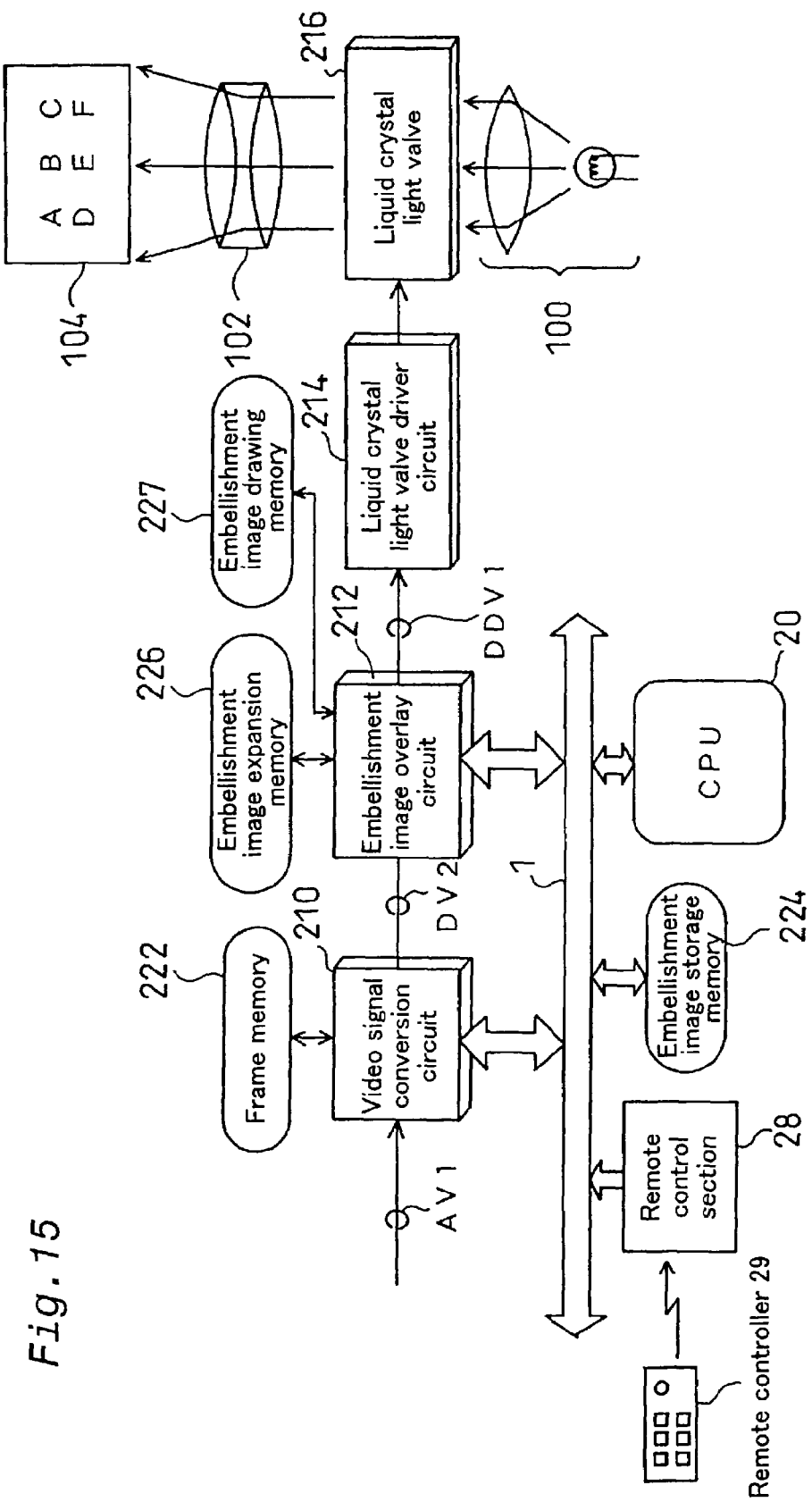
FIG. 15 is a block diagram for schematically illustrating the general configuration of a projection display apparatus that is a third embodiment of this invention.

FIG. 15 is a block diagram for schematically illustrating the general configuration of a projection display apparatus that is a third embodiment of this invention. The projection display apparatus includes a video signal conversion circuit 210, an embellishment overlay circuit 212, a liquid crystal light valve driver circuit 214, a liquid crystal light valve 216, a frame memory 222, an embellishment image storage memory 224, an embellishment image expansion memory 226, an embellishment image drawing memory 227, a remote control section 28, a CPU 20, an illumination optical system 100 and a projection optical system 102. The video signal conversion circuit 210, embellishment overlay circuit 212, embellishment image storage memory 224, remote control section 28 and CPU 20 are connected to each other via a bus 1. The embellishment image expansion memory 226 and embellishment image drawing memory 227 are also connected to the bus 1, but this is not shown in FIG. 15. The liquid crystal light valve 216 is uniformly illuminated by the illumination optical system 100, and images formed by the liquid crystal light valve 216 are projected onto the projection screen 104 by the projection optical system 102. FIG. 15 depicts the optical systems 100 and 102 in a simplified fashion.

The video signal conversion circuit 210 is used to perform analog-digital conversion of input analog video signals AV1, write the converted image data into the frame memory 222 and retrieve image data from the frame memory 222. The analog video signal AV1 can be an RGB signal S1 carrying a computer screen image, or a composite image signal S2 from a video recorder, TV or the like.

Figure 16:
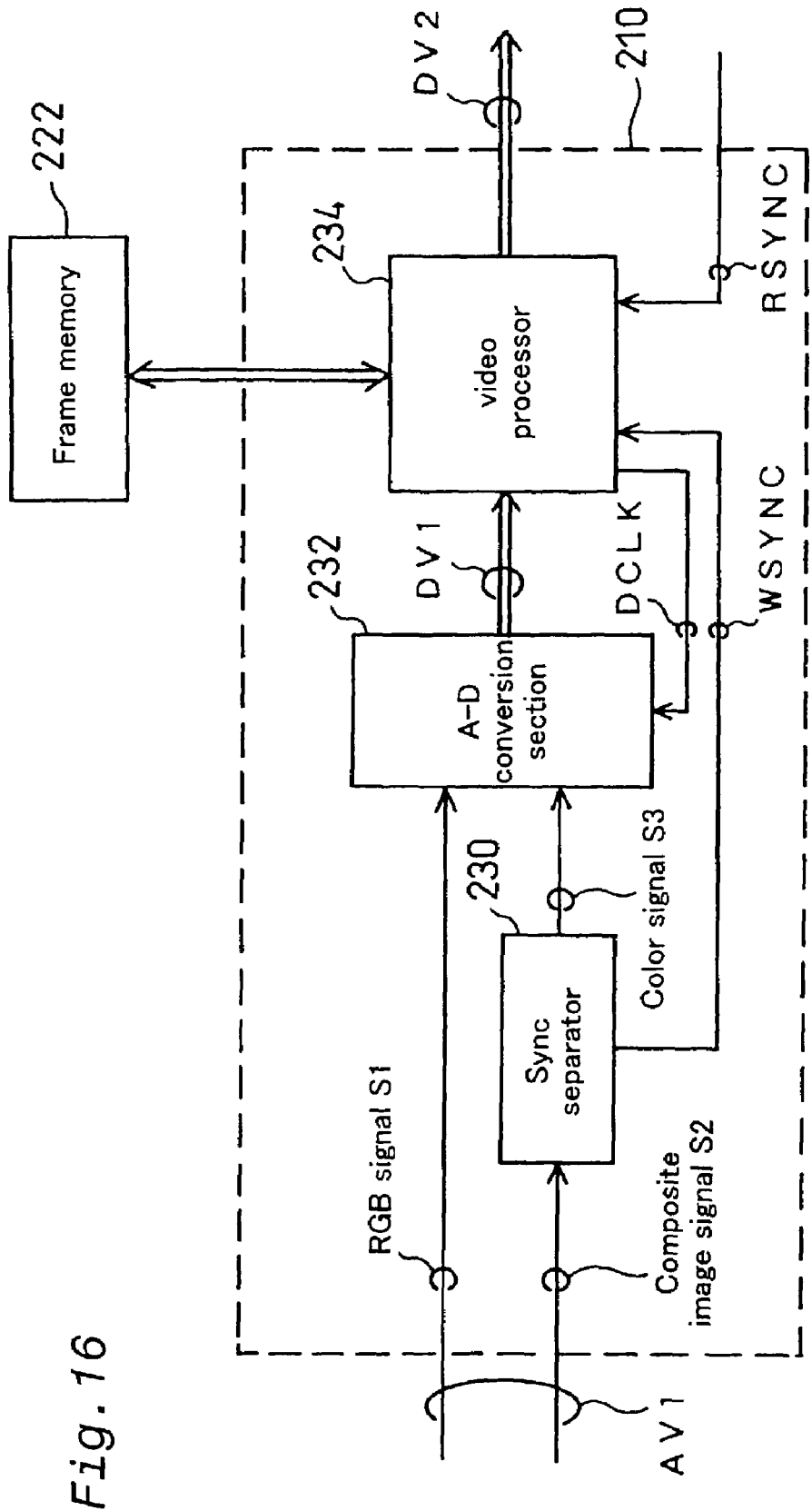
FIG. 16 is a block diagram for schematically illustrating the configuration of a video signal conversion circuit 210.

FIG. 16 is a block diagram for schematically illustrating the configuration of the video signal conversion circuit 210. The video signal conversion circuit 210 includes a sync separator 230, an A-D conversion section 232 and a video processor 234. The functions of the sync separator 230, A-D conversion section 232 and video processor 234 are substantially the same as those of the parts 30, 32 and 34 shown in FIG. 2, so further explanation thereof is omitted.

The embellishment image storage memory 224 is used to store embellishment image data representing the specific type of embellishment image that is to be superimposed on an input image, referred to as a original images. Multiple types of embellishment image data (stored data) are stored in a predetermined format in the embellishment image storage memory 224, which also holds a program to expand the stored data in a bitmap data format. The data in the memory 224 represents images having a prescribed shape or color determined beforehand, referred to below as prescribed images.

The embellishment image expansion memory 226 is used to store the overlay embellishment images as bitmap data, which are expanded by the program in the memory 224.

The embellishment image drawing memory 227 has the same structure as a frame memory, and is used to store embellishment images drawn by the CPU 20.

The embellishment overlay circuit 212 is for overlaying an original image with embellishment images from memory 226 or memory 227.

The embellished image data DDV1 output by the embellishment overlay circuit 212 is supplied to the liquid crystal light valve driver circuit 214 (FIG. 15). The embellished image data DDV1 represents the image overlaid with embellishment images from the embellishment image expansion memory 226 or embellishment image drawing memory 227. Based on the embellished image data DDV1, the liquid crystal light valve driver circuit 214 modulates the illumination light of the illumination optical system 100, via the liquid crystal light valve 216. The light thus modulated is projected onto the projection screen 104 by the projection optical system 102, thereby displaying the embellished image. This liquid crystal light valve 216 corresponds to the electro-optical device used in the second projection display apparatus of this invention, and the liquid crystal light valve driver circuit 214 corresponds to the image display signal generator. Here, the term projection optical system is used in a broad sense that also encompasses the illumination optical system.

The embellished image data DDV1 output by the circuit 212 can be enlarged or reduced by an enlarging/reducing circuit (not shown) provided between the circuits 212 and 214.

The projection display apparatus is controlled by the remote control section 28 in accordance with commands from the remote controller 29. What the remote control section 28 controls is mainly processing related to embellishment images. In accordance with commands received from the remote controller 29, this includes selecting the type of embellishment image and controlling the overlay position and size of embellishment images, and whether embellishment images are displayed or not.

The functions of the video signal conversion circuit 210, embellishment overlay circuit 212 and remote control section 28 can be implemented by a computer program instead of in hardware.

C-2. Configuration and Operation of Embellishment Overlay Circuit

Figure 17:
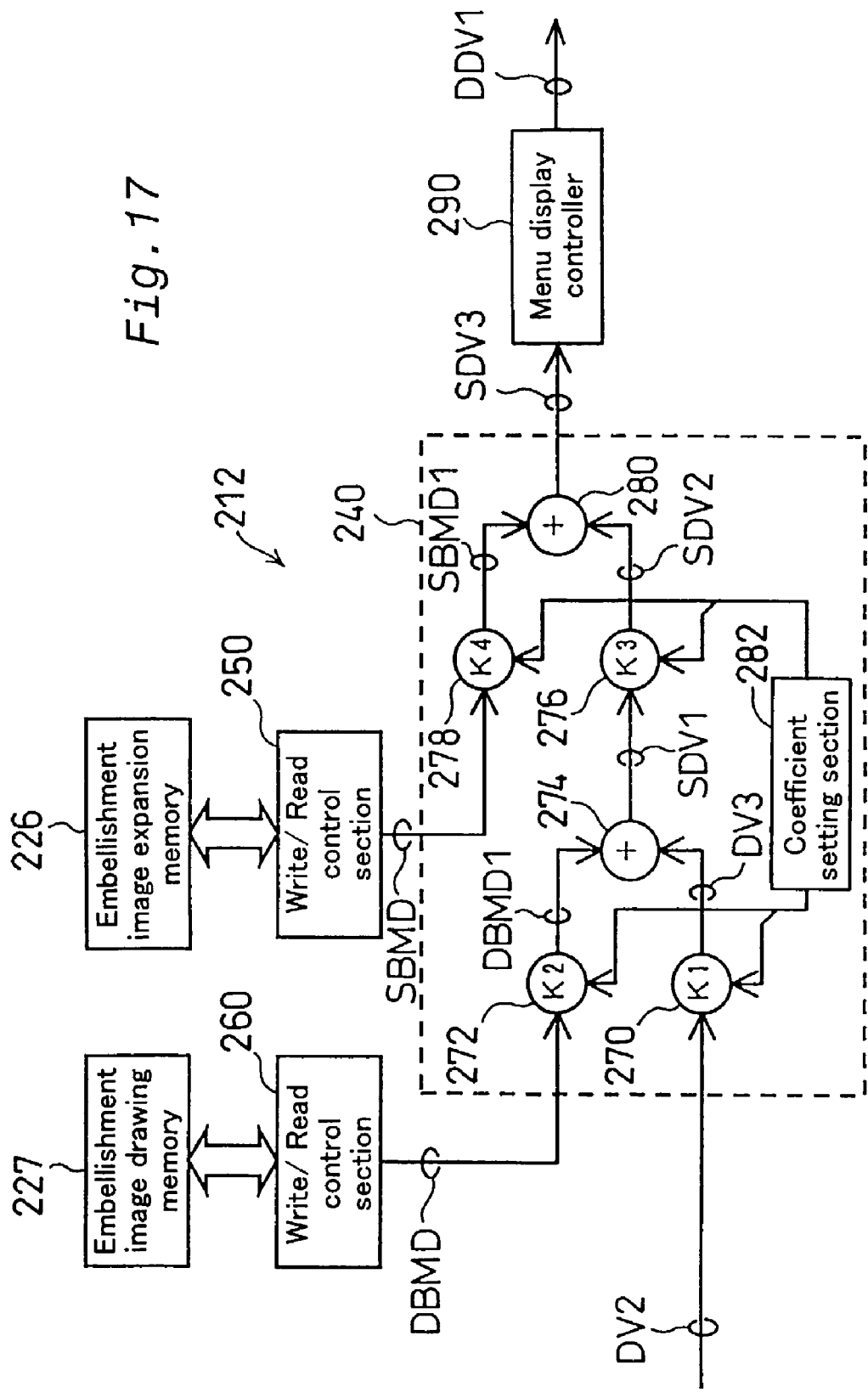
FIG. 17 is a block diagram for schematically illustrating the configuration of an embellishment overlay circuit 212.

FIG. 17 is a block diagram for schematically illustrating the configuration of the embellishment overlay circuit 212. The embellishment overlay circuit 212 includes an overlay processing section 240, two write/read control sections 250 and 260, and a menu display controller 290. The menu display controller 290 superimposes menu screen data on the image data SDV3 output by the overlay processing section 240, and outputs image data DDV1 with the superimposed menu screen. That is, the menu display controller 290 is controlled by remote control section 28 when the user selects images and settings by using the remote controller 29 and displays a menu according to commands.

The first write/read control section 250 is used to read stored data CPD from the embellishment image storage memory 224 and write the data to the embellishment image expansion memory 226, and to read out data stored in the memory 226. The second write/read control section 260 is used to write embellishment images drawn by the CPU 20 to the embellishment image drawing memory 227, and to read out images stored in the memory 227.

Figure 18A:
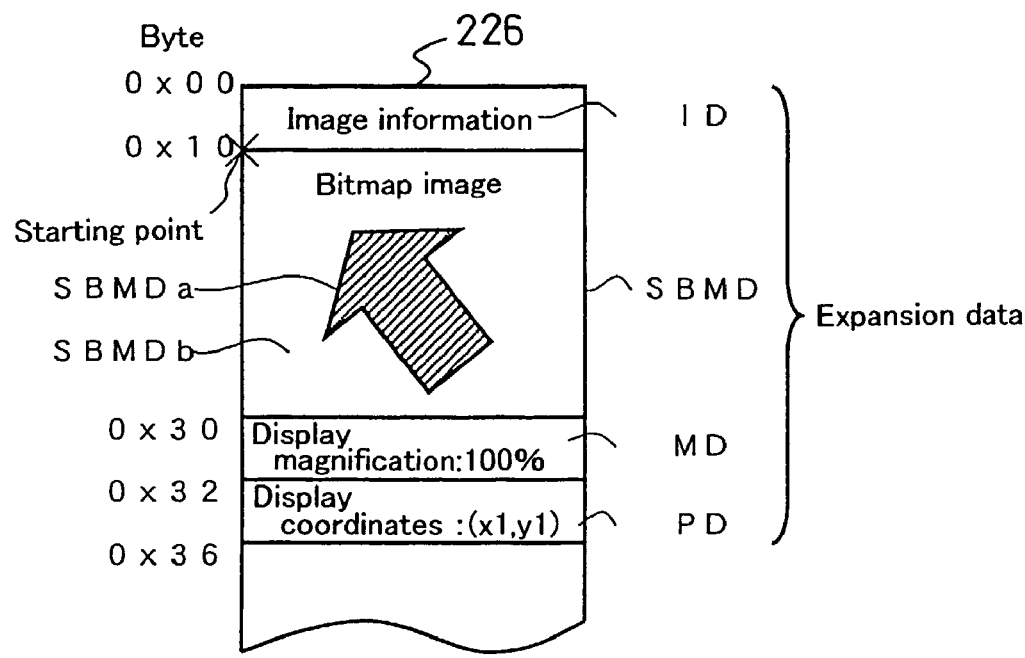
FIGS. 18(a) and 18(b) are diagrams for explaining an embellishment image expansion memory 226 and an embellishment image drawing memory 227.
Figure 18B:
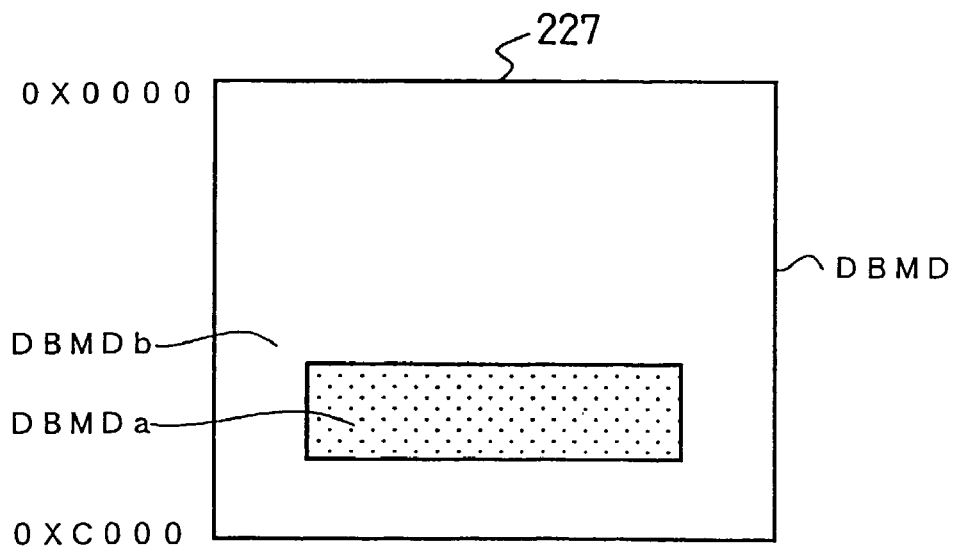

FIGS. 18(*a*) and 18(*b*) are diagrams for explaining the embellishment image expansion memory 226 and an embellishment image drawing memory 227. FIG. 18(*a*) shows the memory space of the memory 226.

The memory 226 is used to store the data of prescribed images expanded by the program in the embellishment image storage memory 224. This expansion image data includes image information ID, prescribed image bitmap data SBMD, display magnification data MD and coordinate data PD. The image information ID shows the width, height and other such image attributes. Prescribed image bitmap data SBMD denotes the pixel data of the expanded prescribed image, in this case the arrow cursor. The data SBMD includes overlay image data SBMDa and background image data SBMDb. The display magnification data MD shows the vertical and horizontal magnification factors. The coordinate data PD shows the coordinates (x1, y1) indicating where on the original image the embellishment image represented by the prescribed image bitmap data SBMD is to be superimposed. The header of the image data SBMD (the starting or base position of the prescribed image, at the upper left) is associated with the position of coordinates (x1, y1). The image information ID is expanded starting from address 0X00 in memory 226. Image data SBMD is expanded starting from address 0X10. Display magnification data MD is stored starting from address 0X30. Coordinate data PD is stored starting from address 0X32. Here, X is an arbitrary value from hexadecimal 0 to F.

When the image data SBMD is read out of the embellishment image expansion memory 226, in accordance with the display magnification data MD it is enlarged in the embellishment overlay circuit 212 to a similar figure and superimposed on the original image. The enlargement is effected by controlling the read clock in the write/read control section 250. For example, a ×2 enlargement vertically and horizontally, meaning a display magnification of 200% that quadruples the image area, can be achieved by reading out pixel data using a pixel clock frequency that is half the frequency used when no magnification is used, thereby reading out the data for each pixel twice in each direction, doubling the size of the image display. Similarly, a display magnification of 400% can be achieved by running the pixel clock at 1/4 frequency. Thus, a magnification of $2^n$ in each direction can be achieved by running the pixel clock at a frequency $1/2^n$. A dedicated processing circuit can be provided to effect enlargements by any desired factor.

The user can use an embellishment image display key on the remote controller 29 associated with a particular embellishment image to have the embellishment image data concerned expanded in the embellishment image expansion memory 226. The remote controller 29 can be used to display menu screens to use for associating a particular embellishment image with a specific key. The remote controller 29 can also be used to specify a display magnification data MD which is allowed to be set.

Figure 19:
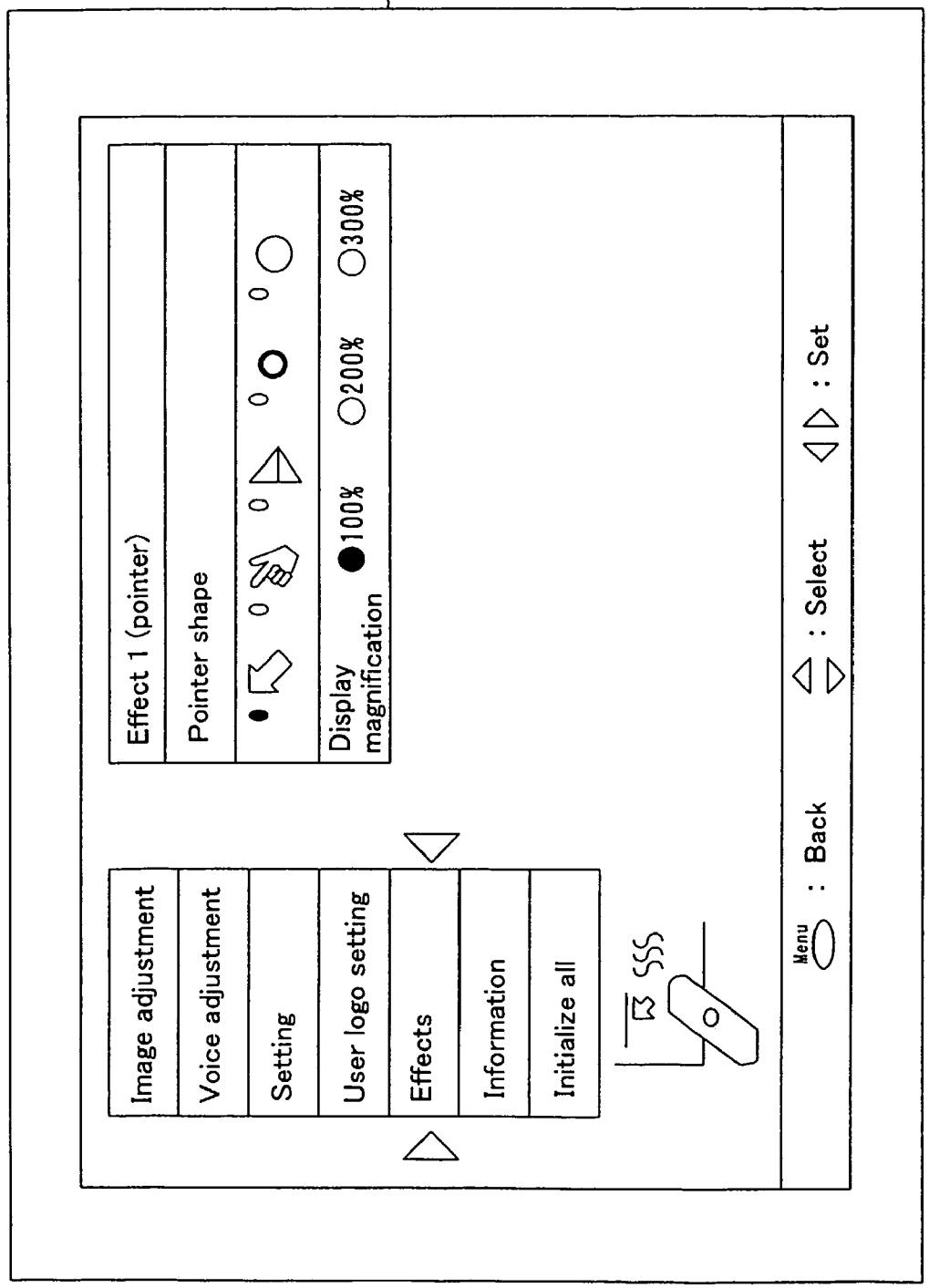
FIG. 19 is a diagram for explaining a menu screen displayed by a user operating a remote controller 29.

FIG. 19 is a diagram for explaining a menu screen displayed by a user operating a remote controller 29. The example shown is one in which the user has operated the remote controller 29 to display the menu, selected Effects (embellishment condition setting mode), and selected Effect 1 (pointer image) among a plurality of Effects. The select key on the remote controller 29 can be used to select one of the five pointers shown, and it is also possible to select one of the three display magnification ratios shown. The display magnification data MD can be set at prescribed values which are included in the stored data and expanded in the memory 226. The embellishment image display key can be used to set the pointer shape and/or magnification from the menus each time. The menu screen of FIG. 19 is just an example, and is not limited to the image shapes and magnifications shown. Instead, a larger selection of image shapes can be provided, and the display magnification can be set at any factor desired.

The coordinate data PD can be obtained by using a pointing device attached to the remote controller 29 specify the position of the overlay within the original image data. Instead, the embellishment image data can be stored in the memory 224 from a floppy disk or other such recording media, and selected using the remote controller 29. A communication line can also be used to store the data in the memory 224. Prescribed images can also be extracted from display images stored in the frame memory 222, and placed in the memory 224.

FIG. 18(*b*) shows the memory space in the embellishment image drawing memory 227. The embellishment image drawing memory 227 has the same structure as the frame memory described above. The memory 227 includes three storage areas, one for each of the RGB colors. The width of the storage for each pixel corresponds to the data width of one pixel. Drawn image bitmap data DBMD drawn by the CPU 20 is stored in the memory 227. The drawn image bitmap data DBMD includes draw data DBMDa drawn by the CPU 20, and background image data DBMDb.

The embellishment image drawing memory 227 has $(1/4)^2$ the capacity of the frame memory 222. When the drawn image bitmap data DBMD drawn by the CPU 20 is read out of the memory 227, it is enlarged by a factor of $4^2$ and superimposed using the same number of pixels as the original image. As described in the foregoing, the readout is done using a 1/4 frequency pixel clock. The embellishment image drawing memory 227 does not have to have $(1/4)^2$ the capacity of the frame memory 222, and can instead have $(1/2)^2$, $(1/3)^2$ . . . the capacity. Or, it can have the same capacity as the frame memory 222. Thus, if the capacity of the frame memory 222 is M×N pixels, the memory 227 only needs to have a capacity of (M/n)×(N/n) pixels (where n is an integer of 1 or more). If the memory 227 has $1/n^2$ the capacity of the frame memory 222, embellishment images drawn by the CPU 20 are reduced $1/n^2$-fold for storage in the memory 227. The size and cost of the apparatus can be reduced by using a memory 227 that is smaller than the frame memory 222. Ideally, n is preferable to $2m^2$ (where m is an integer). If the memory 227 is given a capacity that is $1/2^{2m}$ (where m is an integer) the capacity of the frame memory 222, it is possible to readily enlarge the embellishment image by a factor of $2^{2m}$ simply by setting the pixel clock to $1/2^m$ the frequency when reading out the embellishment image data from the memory 227. In such cases, a dedicated processing circuit is not needed.

The overlay processing section 240 includes four multipliers 270, 272, 276 and 278, two adders 274 and 280, and a coefficient setting section 282. There is an overlay processing section 240 for each of the colors RGB.

The multipliers 270, 272, 276 and 278 are used to multiply image pixel data by a fixed factor.

The coefficient setting section 282 is used to set coefficients k1, k2, k3, k4 for the respective multiplier 270, 272, 276, 278. The coefficients can be set to a value from 0 to 1, and generally are set so that the sum of (k1 k3), (k2 k3), k4 is 1.

Original image data DV2 from the video processor 234 (FIG. 16) is input to the first multiplier 270, and embellishment image data DBMD from the embellishment image drawing memory 227 is input to the second multiplier 272. Embellishment image data SBMD retrieved from the embellishment image expansion memory 226 is input to the forth multiplier 278. In the first multiplier 270, the original image data DV2 is multiplied by k1. In the second multiplier 272 the first embellishment image data DBMD (drawn image bitmap data) is multiplied by k2. In the forth multiplier 278, the second embellishment image data SBMD (prescribed image bitmap data) is multiplied by k4. Original image data DV3 output by the first multiplier 270 and first embellishment image data DBMD1 output by the second multiplier 272 are added by the adder 274 and output as overlay image data SDV1 to the third multiplier 276 where the data is multiplied by k3. Overlay image data SDV2 output by the third multiplier 276 and second embellishment image data SBMD2 output by the forth multiplier 278 are added by adder 280. As a result, embellished image data SDV3 output by the adder 280 is original image data DV2 overlaid with first embellishment image data DBMD and second embellishment image data SBMD.

Figure 20A:
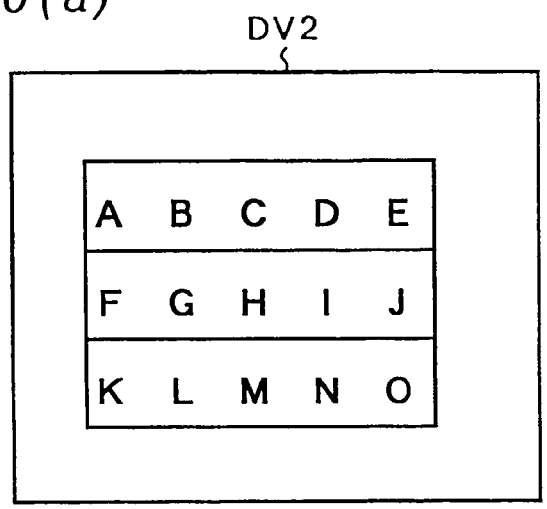
FIG. 20(a)-(c) are diagrams for explaining overlay image data SDV1 formed by overlaying image data DV2 with first embellishment image data DBMD.
Figure 20B:
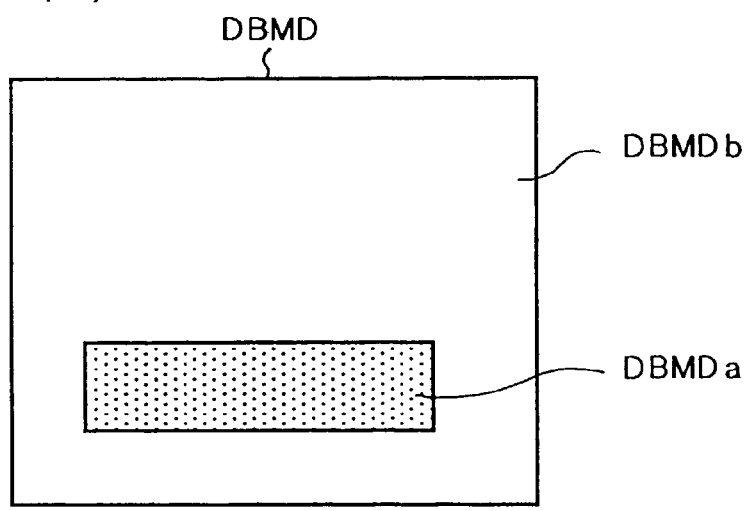
Figure 20C:
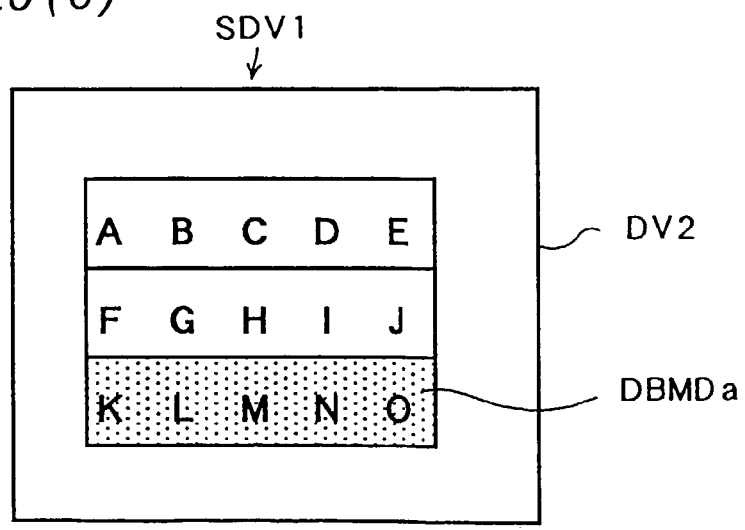

FIG. 20(a)-(c) are diagrams for explaining overlay image data SDV1 formed by overlaying image data DV2 with first embellishment image data DBMD (drawn image bitmap data). The overlay image data SDV1 of FIG. 20 (c) was produced by effecting a pixel by pixel overlay of the original image data DV2 of FIG. 20(a) by the first embellishment image data DBMD of FIG. 20(b). By setting coefficients k1, k2 at (0.5, 0.5), the rectangle of the draw data DBMDa as the first embellishment image data superimposed on the original image data DV2 becomes semitransparent, so the row of letters KLMNO is visible. By setting k1, k2 (FIG. 17) to (0, 1), the rectangle of the draw data DBMDa can be made opaque, so the row of letters KLMNO cannot be seen. Whether the first embellishment image data is semitransparent or opaque is set when the first embellishment image data DBMD is drawn by the CPU 20 and stored in the embellishment image drawing memory 227.

When the part of the embellishment image data DBMD that is being read out of the embellishment image drawing memory 227 is the background image data DBMDb, it is better not to superimpose the background image data DBMDb on the original image data DV2. Therefore, transparent image data having a designated value is stored in the background image data DBMDb portion. The coefficients k1, k2 can be set to (1, 0) when this designated transparent image data is being read out, so the image data is not used as overlay. The coefficients k1, k2 can be set to (0.5, 0.5) to use the background image data DBMDb as a semitransparent image. The first embellishment image data DBMD pixel data can be provided with flags to set whether or not the image data is to be used as overlay.

Figure 21A:
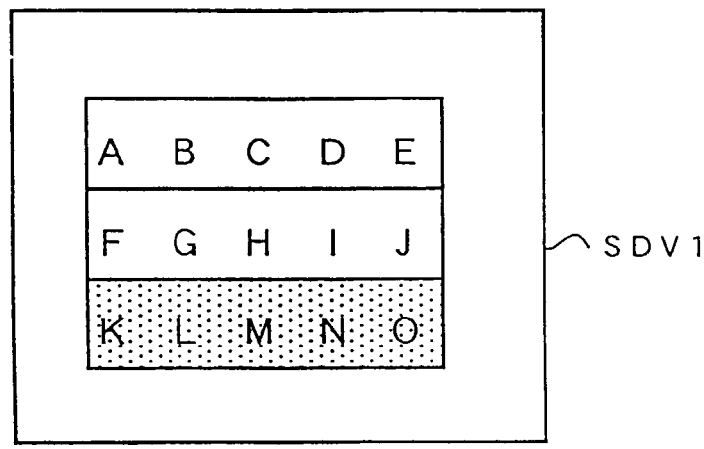
FIG. 21(a)-(c) are diagrams for explaining the embellished image data SDV3 formed by the overlay image data SDV1 overlaid by the second embellishment image data SBMD.
Figure 21B:
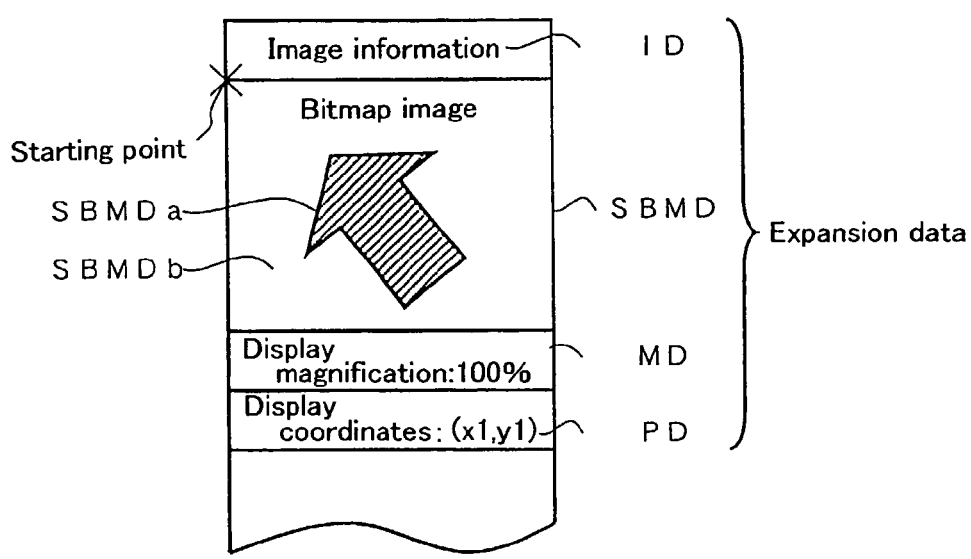
Figure 21C:
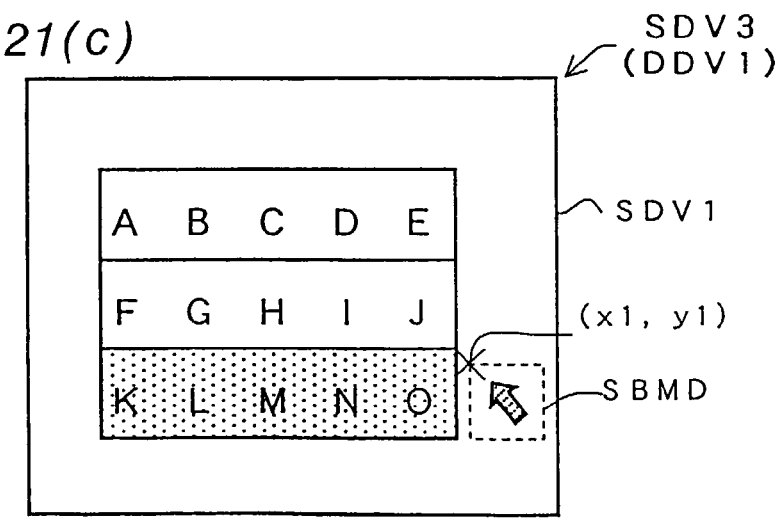

FIG. 21(a)-(c) are diagrams for explaining the embellished image data SDV3 formed by the overlay image data SDV1 overlaid by the second embellishment image data (prescribed image bitmap data) SBMD. The embellished image data SDV3 of FIG. 21(c) was produced by overlaying the overlay image data SDV1 of FIG. 21(a) with the second embellishment image data SBMD of FIG. 21(b) at a display magnification of 100%, using as the base point a position defined by the coordinates (x1, y1). The overlaying of the second embellishment image data (prescribed image bitmap data) SBMD is implemented based on the image information ID, display magnification data MD and coordinate data PD. In the embellishment overlay circuit 212 (FIG. 17), the original image data DV2 and the first embellishment image data DBMD stream into the multipliers 270 and 272. In the case of the forth multiplier 278, the prescribed image bitmap data SBMD is input only into the area comprising the overlay portion, defined by the coordinates (x1, y1), the width and height of the prescribed image bitmap data SBMD (which is information stored in the image data ID) and the display magnification data MD. The timing of the input of the data SBMD to the forth multiplier 278 is controlled by the write/read control section 250 in accordance with the coordinates (x1, y1), the width and height of the prescribed image bitmap data SBMD and the display magnification data MD.

If the coefficients k3, k4 (FIG. 17) are set to (0, 1), the second embellishment image data SBMD will be superimposed on the overlay image data SDV1 as an opaque image that does not allow the overlay image data SDV1 to show through. The overlay image data SDV1 can be seen if k3, k4 are set at (0.5, 0.5).

When the part of the second embellishment image data SBMD that is being read out of the embellishment image expansion memory 226 is the background image data SBMDb, it is better not to superimpose this background image data SBMDb on the overlay image data SDV1. Therefore transparent image data having a designated value is stored in the background image data SBMDb portion. The coefficient k3, k4 can be set to (1, 0) when this designated transparent image data is being read out so that it is not used as overlay. The coefficient k3, k4 can be set to (0.5, 0.5) to use the background image data SBMDb as a semitransparent image. The second embellishment image pixel data can be provided with flags to set whether or not the image data is to be used as overlay.

The coefficient setting section 282 can examine the embellishment image data SBMD and DBMD and set the coefficients k1 to k4, in accordance with the conditions, on a pixel by pixel basis. The coefficient values mentioned above are just examples; the coefficients can be set at any value from 0 to 1, depending on the conditions of use.

When the coefficients are set to 1 or 0, for an opaque overlay image, the overlay processing section 240 does not have to be comprised of the multipliers 270, 272, 276 and 278 and the adders, but can instead be configured as a selector that selects the original image, or the first embellishment image, or the second embellishment image, on a pixel by pixel basis.

As described in the foregoing, the embellishment overlay circuit 212 can overlay original image data DV2 output by the video processor 234 with first embellishment image data (drawn image bitmap data) DBMD read from the embellishment image drawing memory 227 and second embellishment image data (prescribed image bitmap data) SBMD read from the embellishment image expansion memory 226. It can also overlay menu screen data. This means that it is possible to overlay images received from a computer or the like with various types of embellishment images, as explained below.

Figure 22A:
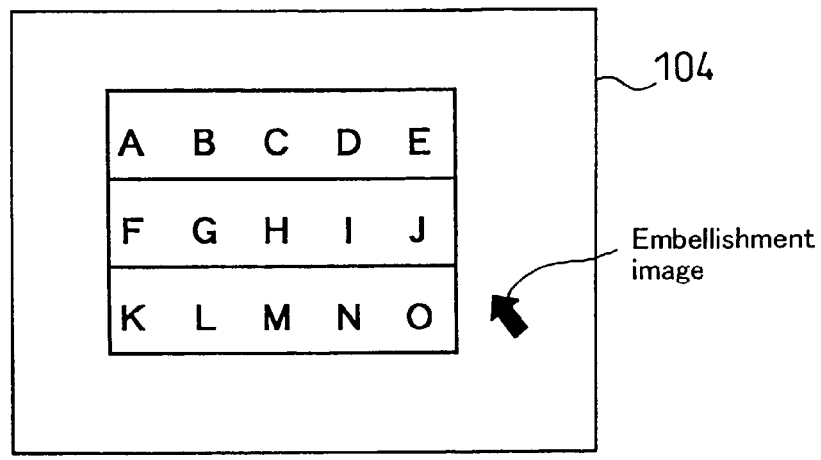
FIG. 22(a)-(c) are diagrams for explaining examples of displays on the projection screen 104 of images input from a personal computer that have been overlaid with embellishment images of a specific shape stored in the embellishment image storage memory 224.
Figure 22B:
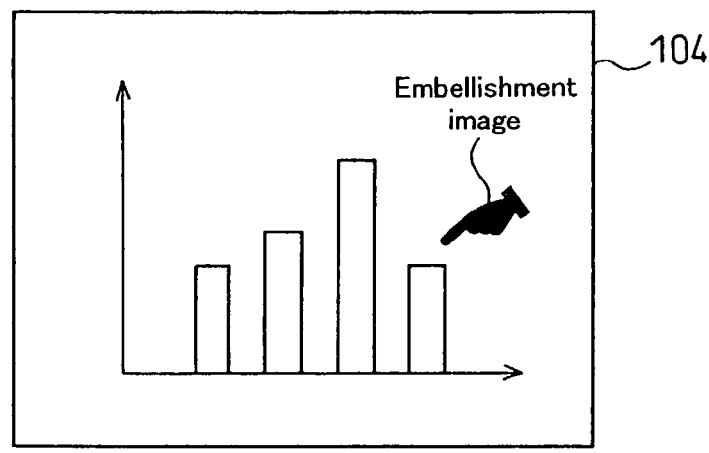
Figure 22C:
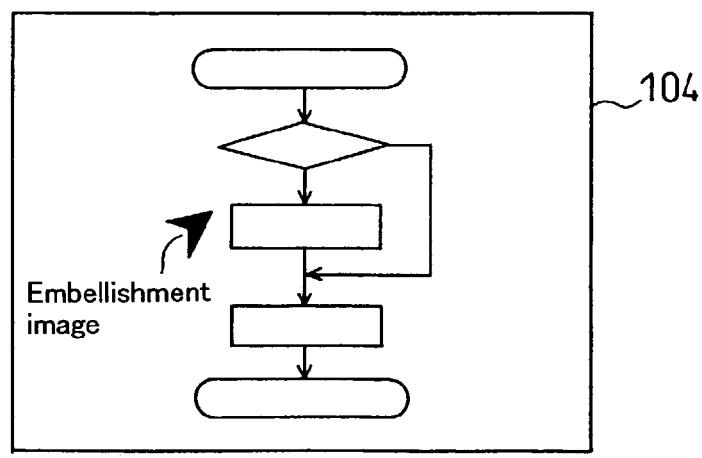

FIGS. 22(a)–(c) are diagrams for explaining examples of displays on the projection screen 104 of images input from a personal computer that have been overlaid with embellishment images of a specific shape stored in the embellishment image storage memory 224. FIG. 22(a) shows a pointer (arrow figure) superimposed on the original image, a chart; FIG. 22(b) shows a different pointer (pointing figure) superimposed on a bar graph; and FIG. 22 (c) shows another pointer (check figure), superimposed on a flow chart. Images having a prescribed shape (prescribed image) such as these pointers can be read out of the embellishment image storage memory 224 and placed in the embellishment image expansion memory 226 for superimposing on the original image.

As shown in FIG. 18(a), the embellishment image data stored in the memory 226 includes coordinate data PD denoting the overlay position for the prescribed image bitmap data SBMD. A pointing device on the remote controller 29 can be used to change this position as desired. The display on the screen 104 is constantly being refreshed in sync with the sync signal RSYNC, so the embellishment image (pointer) can be moved anywhere on the screen on a realtime basis. Each of the examples shown in FIGS. 22(a), (b) and (c) depict a single pointer, but multiple pointers can be used by storing the necessary data for the multiple pointers in the memory 226.

Figure 23A:
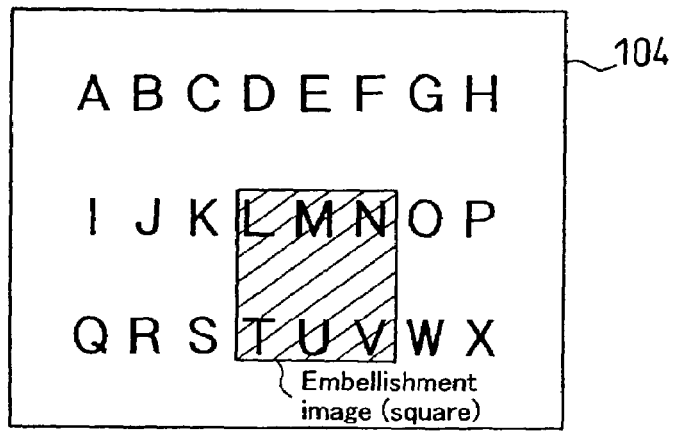
FIG. 23(a)-(c) are diagrams for explaining examples of displays on the projection screen 104 of images input from a personal computer that have been overlaid with embellishment images drawn by the CPU 20.
Figure 23B:
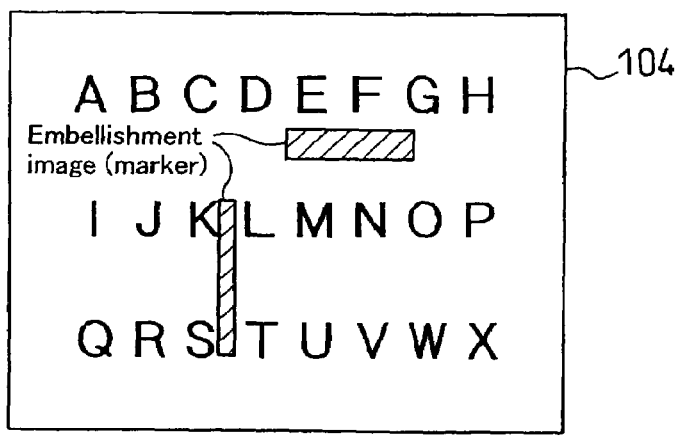
Figure 23C:
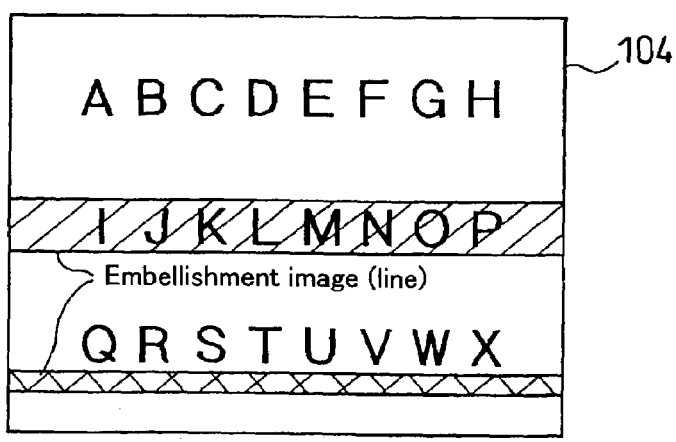

FIG. 23(a)-(c) are diagrams for explaining examples of displays on the projection screen 104 of images input from a personal computer that have been overlaid with embellishment images drawn by the CPU 20. FIG. 23(a) shows a square shape superimposed on the original image (text); in FIG. 23(b) the embellishment overlays are lines of different widths; and in FIG. 23(c) the embellishments are line markers of different widths and orientations.

Images such as these drawn by the CPU 20 are stored in the embellishment image drawing memory 227 in a state of equivalence with the display screen, to be used on original images.

The embellishment image in FIGS. 22(a)–(c) are shown as opaque images, but can be changed to semitransparent images by selecting semitransparent embellishments of the same shape. Conversely, in the case of FIGS. 23(a)–(c) opaque embellishment images can be superimposed instead of the semitransparent ones shown, by selecting an opaque color and having the CPU 20 redraw the image accordingly.

Original images can be overlaid with various embellishment images, such as those described below, by using the second embellishment image data (drawn image bitmap data) stored in the embellishment image expansion memory 226 and the first embellishment image data (prescribed image bitmap data) stored in the embellishment image drawing memory 227.

C-3. Box Images

Figure 24A:
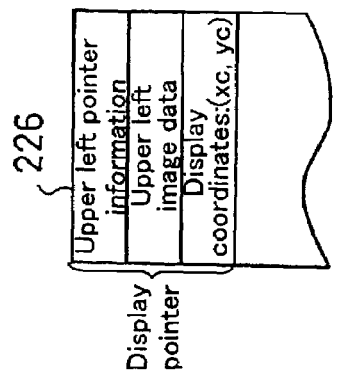
FIG. 24(a)-(c) are diagrams for explaining the process of overlaying an original image with a square embellishment image.
Figure 24B:
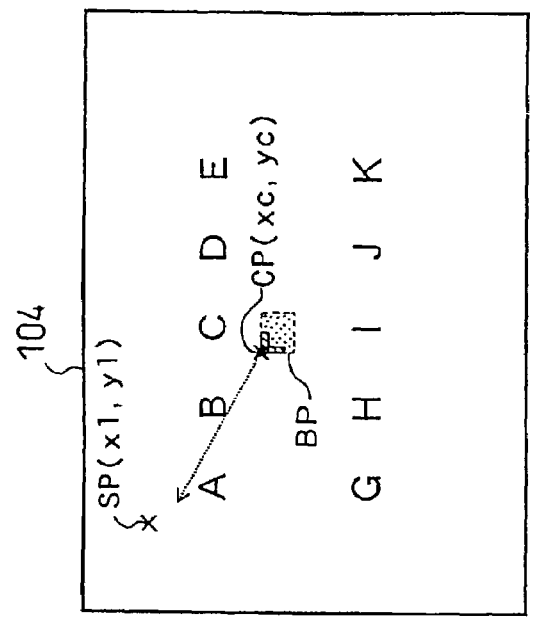
Figure 24C:
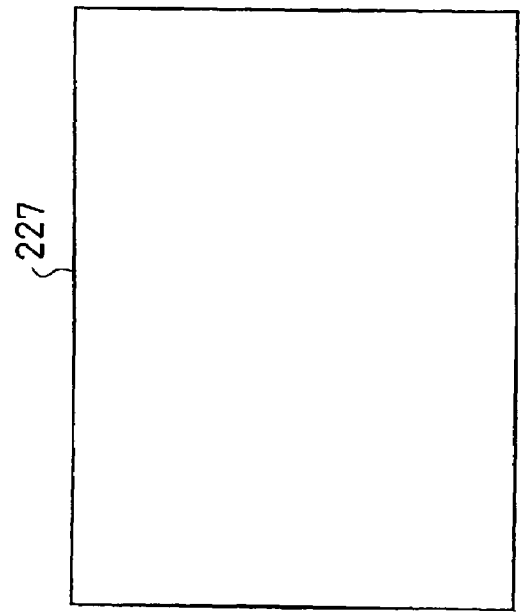

FIGS. 24(a)–(c), 25(a)–(c) and 26(a)–(c) are diagrams for explaining the process of overlaying an original image with square embellishment images. FIG. 24(a) shows embellishment image data stored in the memory 226; FIG. 24(b) shows the embellishment image data stored in the memory 227; and FIG. 24(c) shows images displayed on the projection screen 104.

To superimpose a square embellishment image on an original image, first the box image display function is called by pressing a key on the remote controller 29 that has been assigned for the operation beforehand. The square embellishment image is a square image that has diagonal connecting two points on the display screen, referred to below as the box image. The box image conditions are set beforehand using menu screens such as those shown in FIG. 19. These menus are used with the remote controller 29, for example, to select the box color among multiple colors (blue, red, green, yellow, magenta, white, pink and so on), a semitransparent or opaque box image, the type of dot pattern used in the box image area, and so forth. Or, the system can be configured so that a menu is displayed each time the box image display key is pressed, to enable the image conditions such as color to be set according to a menu, and the conditions then stored in the embellishment image expansion memory 226.

When the box image display function is intended, the box coordinate pointer BP image data for setting the two point coordinates that define the diagonal of the box image is read out of the embellishment image storage memory 224 and placed in the embellishment image expansion memory 226 shown in FIG. 24(a). The memory 224 contains multiple sets of image data of the box coordinate pointer BP corresponding to each of the image conditions such as color selected by using remote controller 29.

When the box image display function is initiated, the selected image data is stored in the memory 226. The box coordinate pointer BP image data includes image information (upper left pointer information), prescribed image bitmap data (upper left image data), and coordinate data (display coordinates (xc, yc)). The box coordinate pointer BP image data is displayed on the projection screen 104, superimposed on the original image data stored in the frame memory 222, at a position CP given by the coordinates (xc, yc), as shown in FIG. 24(c). As indicated by FIG. 24(b), at this point there is nothing in memory 227.

Using the above-described pointing device, the coordinates (xc, yc) of display position CP can be moved to any point desired as shown in FIG. 24(c). When the box coordinate pointer BP has been moved to the desired position, the coordinates (x1, y1) of a starting point SP on the diagonal of the box image are specified by pressing the enter button on the remote controller 29.

Figure 25C:
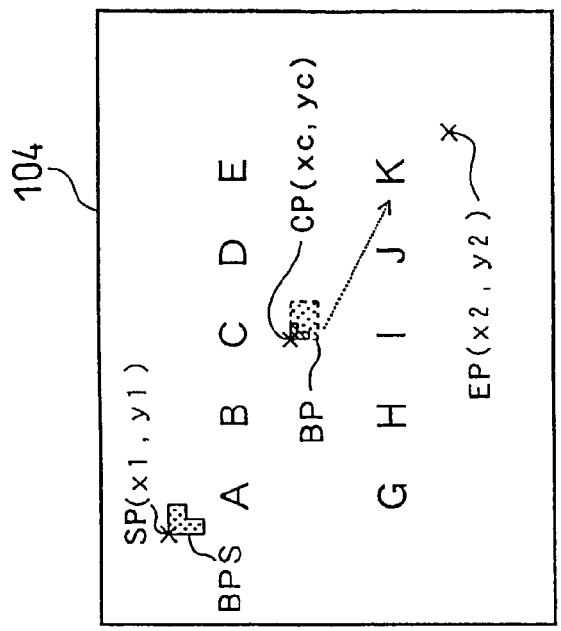
FIG. 25(a)-(c) are diagrams for explaining the process of overlaying an original image with a square embellishment image.
Figure 25B:
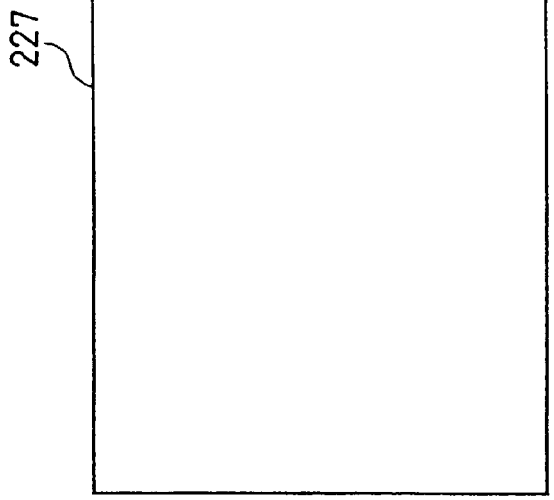
Figure 25A:
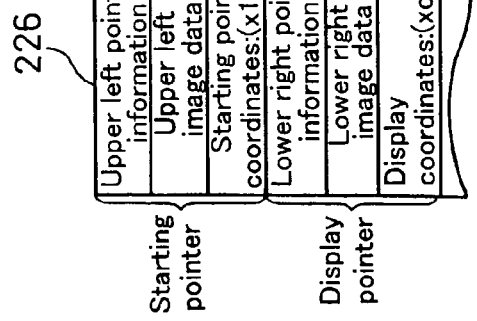

When this is done, in addition to the box coordinate pointer BP, an image of a starting pointer BPS appears on the display at the specified starting point SP, as shown in FIG. 25(c). For this, the image data for the starting pointer BPS and for the box coordinate pointer BP are read out of the embellishment image storage memory 224 and into the embellishment image expansion memory 226 (FIG. 25(a)). The pointing device is then used to move the box coordinate pointer BP to the end point EP at the end of the box image diagonal opposite to the starting point SP, and the EP coordinates (x2, y2) are specified by pressing the enter button on the remote controller 29. In this way, the coordinates (x1, y1), (x2, y2) defining the starting and end points SP and EP along the diagonal of the box image are set, to be utilized when the CPU 20 draws the box image. Here too, the embellishment image drawing memory 227 contains nothing until the end point EP coordinates are specified. There is a starting point cancel key that enables the starting point setting to be cancelled.

Figure 26C:
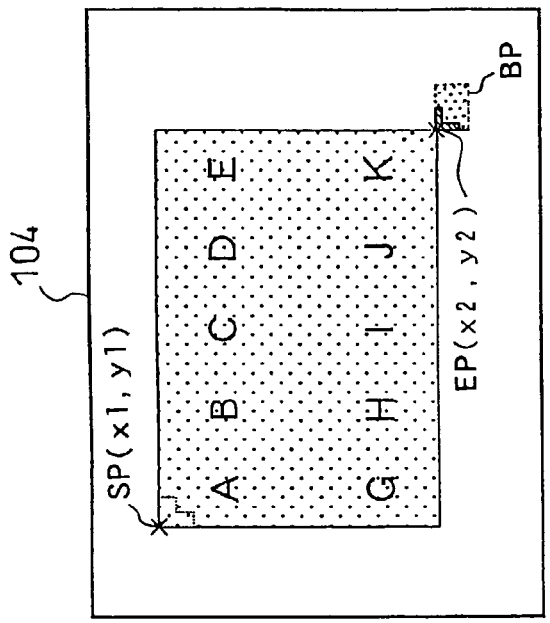
FIG. 26(a)-(c) are diagrams for explaining the process of overlaying an original image with a square embellishment image.
Figure 26B:
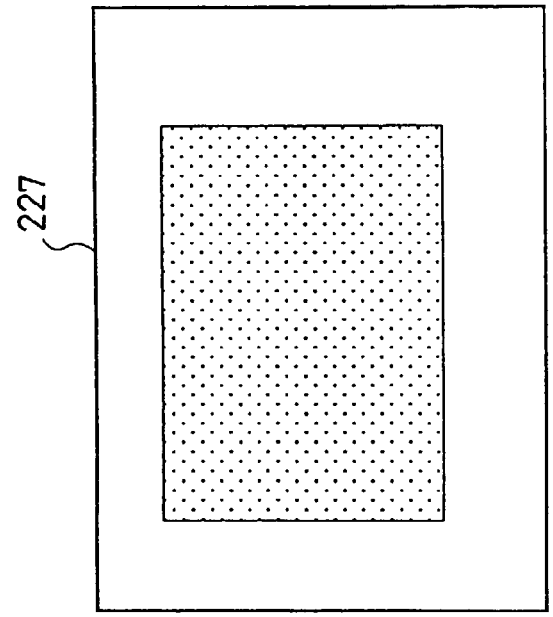
Figure 26A:
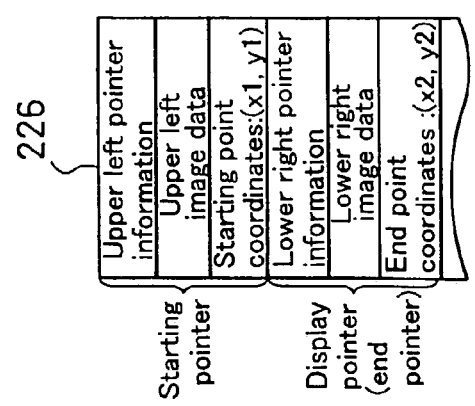

When the starting and end points have been specified by using remote controller 29, the data for a box image to be drawn by the CPU 20 to the same size as the rectangular area defined by the two point coordinates (x1, y1), (x2, y2), with the preset color and other image conditions, is stored in the memory 227 (FIG. 26(b)) and the image data of the starting pointer BPS in memory 226 is erased and disappears from the projection screen 104. Then, the box image in the memory 227 is superimposed on the original image data in the frame memory 222 and the resulting image displayed on the projection screen 104, as shown in FIG. 26(c). Multiple box images can be superimposed on an original image by repeating the above procedure the necessary number of times. The coefficients k3, k4 applied by the multipliers 276, 278 can be set at (1, 0) to have the display of the starting pointer BPS vanish from the screen while still retaining the pointer BPS image data in the memory 226. Alternatively, the starting pointer BPS can be removed from the screen by halting the readout of the image data from the memory 226.

FIG. 27(a)-(d) are diagrams for explaining the relationship between the position SP of a starting pointer BPS, and the position CP of box coordinate pointer BP specifying the end point EP. The image of the starting pointer BPS changes based on the relationship between starting point SP and the position CP. If the point SP coordinates are (x1, y1) and the position CP coordinates are (xc, yc), the starting pointer BPS image will change as follows.

Figure 27A:
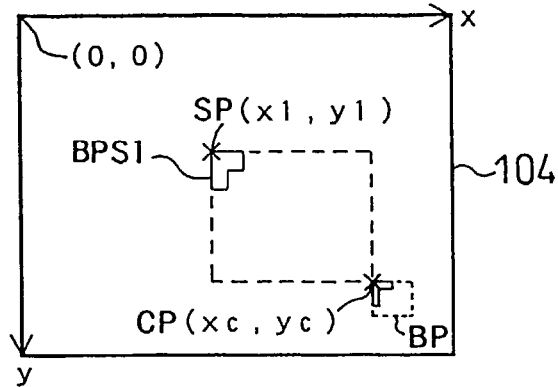
FIG. 27(a)-(d) are diagrams for explaining the relationship between the position SP of a starting pointer BPS, and the position CP of box coordinate pointer BP specifying the end point EP.
Figure 27B:
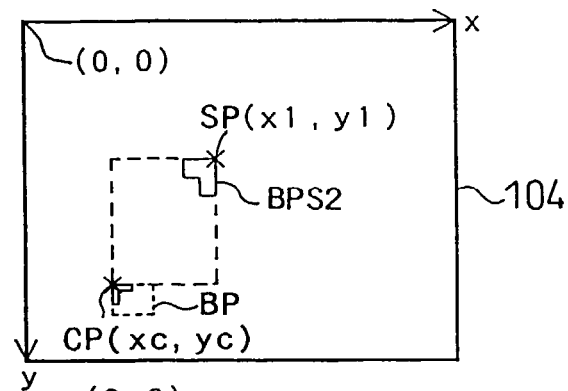
Figure 27C:
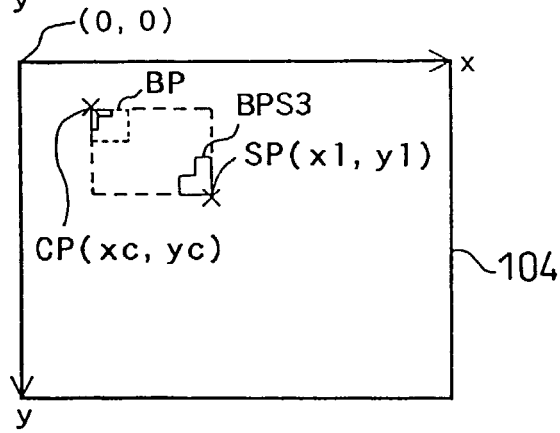
Figure 27D:
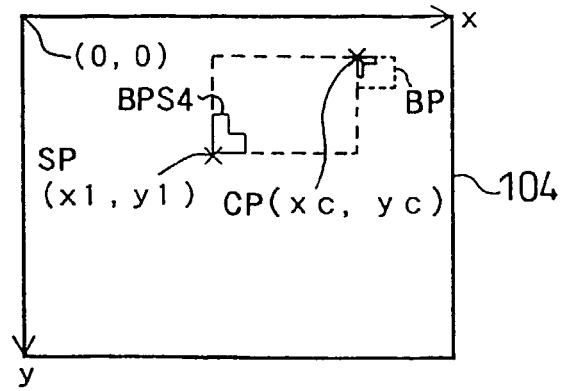

When xc and yc are the same as or greater than x1 and y1, upper left starting pointer BPS1 (FIG. 27(a)) will be selected and stored in the memory 226 as the starting pointer BPS image. When xc is smaller than x1 and yc is the same as or larger than y1, the upper right starting pointer BPS2 is selected and stored in the memory 226 as the starting pointer BPS image (FIG. 27(b)). When xc and yc are smaller than x1 and y1, the lower right starting pointer BPS3 (FIG. 27(c)) will be selected and stored. When xc is the same as or larger than x1 and yc is smaller than y1, the lower left starting pointer BPS4 (FIG. 27(d)) is selected and stored.

Thus, in accordance with the coordinates specified for the points SP and CP, a pointer image is selected that expands from the embellishment image starting point SP in a direction that can be ascertained from the positional relationship between the point SP and BP. This makes it easy for a user to ascertain and specify the desired location of the box image overlay. The memory 224 contains starting pointers BPS and box coordinate pointers BP for each of the image conditions such as color that can be set. User can easily ascertain the image condition to be set. Moreover, a box coordinate pointer BP also may be selected from among the four box coordinate pointers oriented in each direction that makes it possible to ascertain the shape of the embellishment image specified by the pointers BPS and BP, based on the positional relationship between the points SP and CP. In this way, user can ascertain box image more easily.

C-4. Marker Images

FIGS. 28(a)–(c), 29(a)–(c) and 30(a)–(c) are diagrams for explaining the process of overlaying an original image with a marker image. FIG. 28(a) shows the data stored in the embellishment image expansion memory 226, FIG. 28(b) shows the data stored in the embellishment image drawing memory 227, and FIG. 28(c) shows the image as it appears on the projection screen 104.

To superimpose a marker image on an original image, first the marker image display function is called by pressing a pre-assigned key on the remote controller 29. The marker embellishment image is a line image that connects two point on the display screen, referred to as the marker images. Marker image conditions are set beforehand using menu screens such as those shown in FIG. 19. These menus are used with the remote controller 29 to select line color, width, whether the image is semitransparent or opaque, and so forth. A selection of different line types such as a dashed line, a chain line and a wavy line can also be provided. The system can be configured so that a menu is displayed each time the marker image display key is pressed, to set the image conditions. The marker image conditions may be set according to menus and may be stored in the embellishment image expansion memory 226.

When the marker image display function is initiated, marker pointer MP image data for specifying the coordinates of the marker image is read out of the embellishment image storage memory 224 and placed in the embellishment image expansion memory 226. The memory 224 contains multiple sets of image data corresponding to each image condition.

When the marker image display function is initiated, the image data (for example, pen image data) corresponding to the selected image conditions such as line width and color is stored in the memory 226. This marker pointer MP image data includes marker pointer image information, prescribed marker image bitmap data, and image display coordinate data (xc, yc). The marker pointer MP image data is displayed on the projection screen 104, superimposed on the original image data stored in the frame memory 222 at a position CP given by the coordinates (xc, yc), as shown in FIG. 28(c). As can be seen in FIG. 28(b), at this point the memory 227 is empty.

Using the above-described pointing device, the coordinates (xc, ye) of pointer display position CP can be moved to any point desired. At the desired position, the coordinates (x1, y1) of a starting point SP at an end point of the marker image are specified by pressing the enter button on the remote controller 29.

Figure 29A:
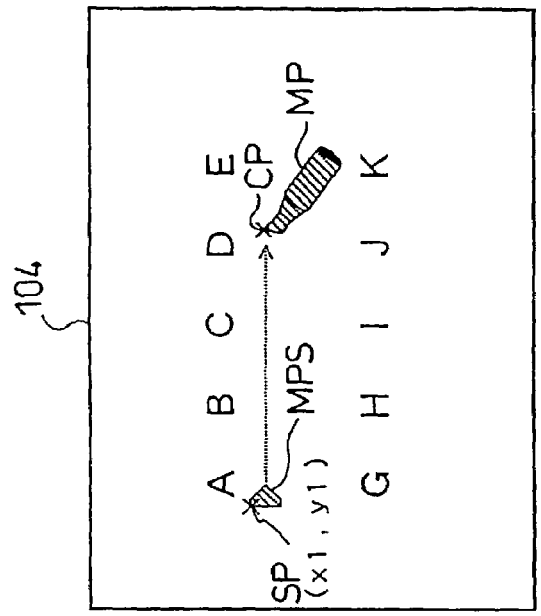
FIG. 29(a)-(c) are diagrams for explaining the process of overlaying an original image with a marker image.
Figure 29B:
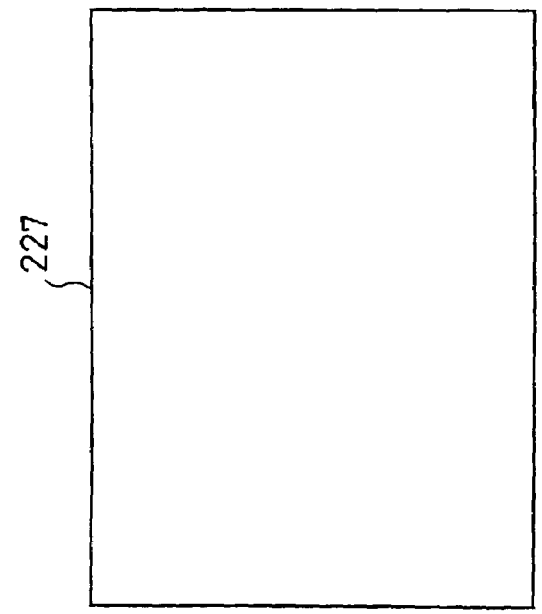
Figure 29C:
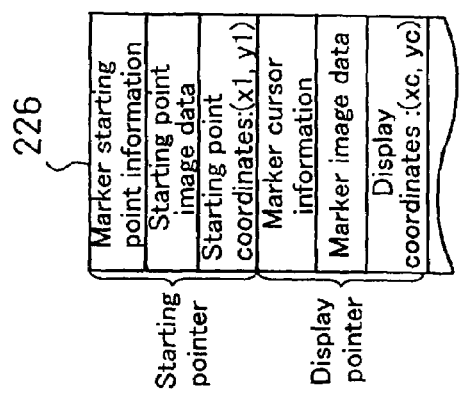
Figure 30C:
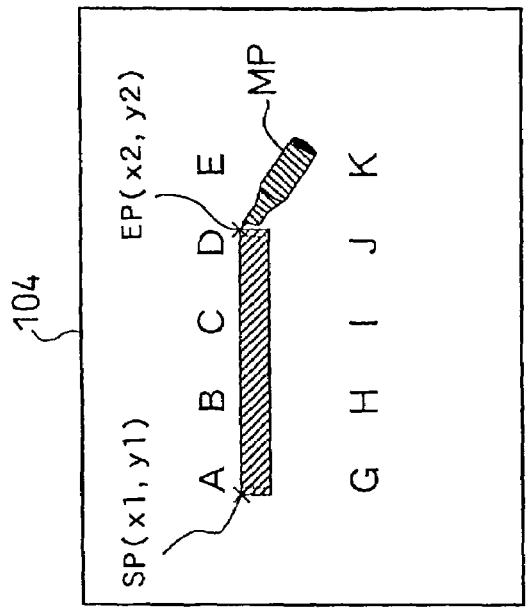
FIG. 30(a)-(c) are diagrams for explaining the process of overlaying an original image with a marker image.
Figure 30B:
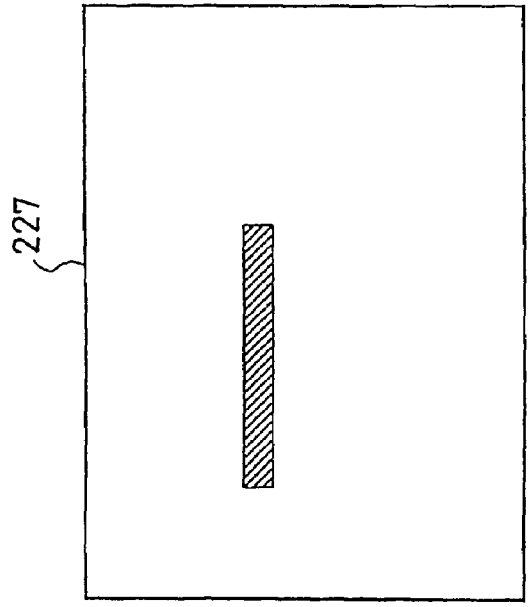
Figure 30A:
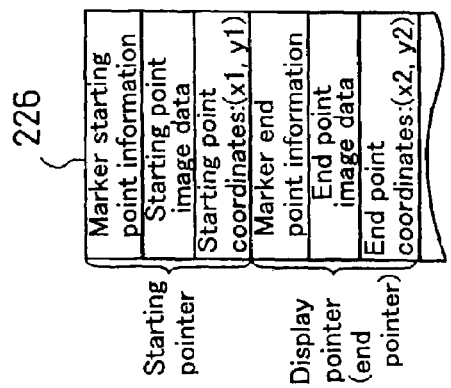

When this is done, an image of a starting pointer MPS appears on the display at the specified starting point SP, in addition to the marker pointer MP, as shown in FIG. 29(c). For this, the image data for the starting pointer MPS and for the marker pointer MP are read out of the embellishment image storage memory 224 and into the embellishment image expansion memory 226. The two sets of image data include data relating to the color and other preset image conditions. The images of the pointers MPS and MP displayed on the screen reflect the colors and other conditions set for the marker image. The pointing device is then used to move the marker pointer MP to specify the coordinates of the end point EP at the other end of the marker image. In this way, the coordinates (x1, y1), (x2, y2) defining the two points SP and EP of the marker image are set, to be utilized when the CPU 20 draws the marker image. At this point too, as can be seen from FIG. 29(b), the memory 227 contains nothing until the end point EP coordinates are specified. A starting point cancel key can be used to cancel the starting point setting.

When the starting and end points SP and EP have thus been specified, a marker image drawn by the CPU 20 in accordance with the preset line width, color and other image conditions is stored in the memory 227 (FIG. 30 (*b*)). At the same time, the image data of the starting pointer MPS in memory 226 is erased and vanishes from the projection screen 104. The marker image data in the memory 227 is superimposed on the original image data in the frame memory 222 and the resulting image displayed on the projection screen 104 (FIG. 30(*c*)). Multiple marker images can be superimposed on the original image by repeating the above procedure the necessary number of times. The example illustrated in FIGS. 28(*a*)–(*c*), 29(*a*)–(*c*) and 30(*a*)–(*c*) is that of a marker extended horizontally, but the marker can also be drawn vertically. The coefficients k3, k4 applied by the multipliers 276, 278 (FIG. 17) can be set at (1, 0) to have the display of the starting pointer MPS vanish from the screen while still retaining the image data in the memory 226. Alternatively, the starting pointer MPS can be removed from the screen by halting the readout of the image data from the memory 226.

As the starting pointer MPS, an image can be selected that exhibits the width, direction and color of the marker pointer MP. In FIGS. 29(*a*)–(*c*), the starting pointer MPS is shown as an image corresponding to part of the marker drawn from the starting point. The apex of the triangle indicates the direction of the marker pointer MP.

C-5. Line Images

FIGS. 31(*a*)–(*c*) and 32(*a*)–(*c*) are diagrams for explaining the process of overlaying an original image with a line image. FIG. 31(*a*) shows the data stored in the embellishment image expansion memory 226, FIG. 31(*b*) shows the data stored in the embellishment image drawing memory 227, and FIG. 31(*c*) shows the image as it appears on the projection screen 104.

To superimpose a line image on an original image, first the line image display function is initiated by pressing a preassigned key on the remote controller 29. The line embellishment is a line image that extends horizontally all the way across the screen, referred to as the line image. Line image conditions are set beforehand using menu screens such as those shown in FIG. 19. These menus are used with the remote controller 29 to select line color, line width, whether the image is semitransparent or opaque, and so forth. A selection of different line types can be provided. The system can be configured so that a menu is displayed each time the line image display key is pressed, to set the image conditions. The line image conditions may be set according to menus and may be stored in the embellishment image expansion memory 226.

When the line image display function is initiated, line pointer LP image data for specifying the coordinates of the line image is read out of the embellishment image storage memory 224 and placed in the embellishment image expansion memory 226. The memory 224 contains multiple sets of line pointer image data corresponding to each image condition.

When the line image display function is initiated, the image data (for example, line image data) corresponding to the selected image conditions such as line width and color is stored in the memory 226. This line pointer LP image data includes line pointer image information, prescribed line image bitmap data, and display coordinate data (yc). The image of the line pointer LP is displayed on the projection screen 104, superimposed on the original image data stored in the frame memory 222 at the position denoted by the coordinate (yc), as shown in FIG. 31(*c*). As shown by FIG. 31(*b*), at this point there is nothing in memory 227.

The above-described pointing device is used to move the line pointer coordinate (yc) vertically to the required position. The position coordinate (yl) is then specified by pressing the enter button on the remote controller 29.

Figure 32C:
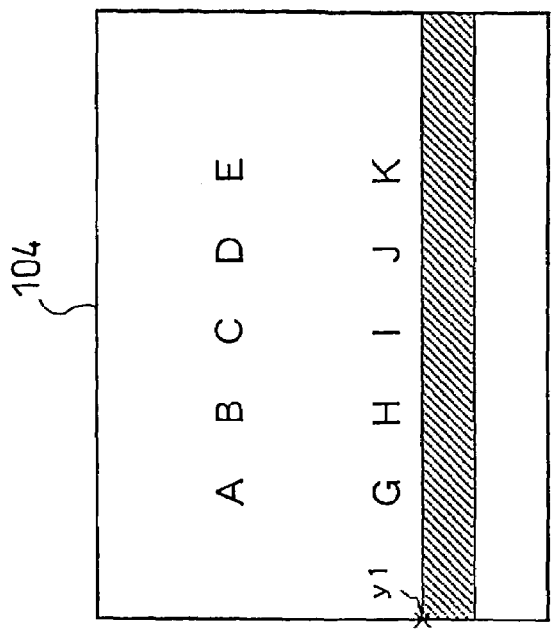
FIG. 32(a)-(c) are diagrams for explaining the process of overlaying an original image with a line image.
Figure 32B:
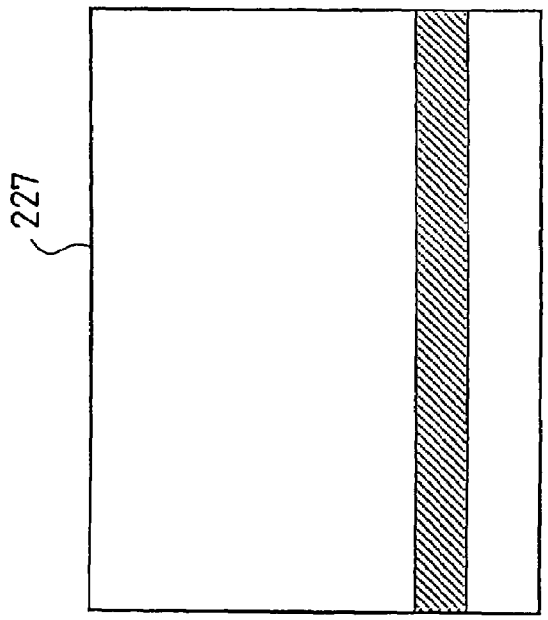
Figure 32A:
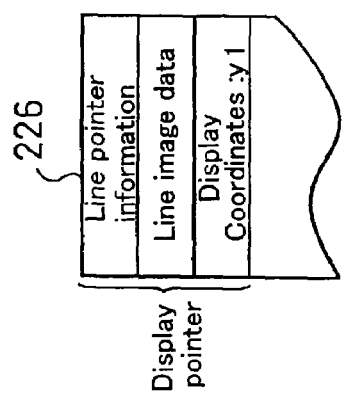

When the line image position has thus been specified, the image data of the line pointer LP is copied to the memory 227, where it is stored at the position corresponding to the coordinate (y1), and with the selected width and color. Line image data is stored in the memory 227. The line image in the memory 227 is superimposed on the original image data in the frame memory 222 and the resulting image displayed on the projection screen 104, as shown in FIG. 32(*c*). In this way, a line image can be superimposed on an original image. Multiple line images can be superimposed on the original image by repeating the above procedure the necessary number of times.

The image data for the line pointer LP stored in the memory 224 relates only to line width and length. The embellishment image expansion memory 226 can be used to develop line image data corresponding to the width of the screen and the selected line width.

C-6. Erasing Embellishment Images

Embellishment images superimposed on original images can be erased from the screen 104 by flushing the embellishment image data stored in the memories 226 and 227. In order to re-display the same embellishment images once this has been done, it is necessary to again select the images and set the related conditions. Another way of removing embellishment images from the screen is to set the coefficients k1, k2, k3, k4 of the embellishment overlay circuit 212 to (1, 0, 1, 0) to prevent the embellishment images read out of the memories 226 and 227 being superimposed on the original image. Alternatively, reading out may be stopped. Since in this case the embellishment image data would still be retained in the memories 226 and 227, they could again be displayed whenever required.

The projection display apparatus of the third embodiments described in the foregoing is able to internally superimpose embellishment images on original images received as input. This means that the projection display apparatus can superimpose embellishment images on image signals output by video recorders and TVs as well as personal computers. Moreover, pointer images used for setting box and marker images are displayed using icons that indicate the type (shape), color, line width, the positional relationship between two designated points and other such display conditions of the images selected, which makes it easy for a user to control the superimposition of embellishments on original images.

As can be understood from the foregoing explanation, the video signal conversion circuit 210, embellishment overlay circuit 212, remote control section 28 and CPU 20 of this embodiment correspond to the image embellishment section in the second projection display apparatus of this invention. And CPU 20 corresponds to the drawing section in the second projection display apparatus of this invention.

The present invention is in no way limited to the details of the examples and embodiments described in the foregoing but various changes and modifications may be made without departing from the scope of the appended claims. For example, the following modifications are also possible.

In the case of the first embodiment, the data selector 64 shown in FIG. 14 could be used to superimpose the embellishment images instead of the two multipliers 40 and 42 and the adder 44 used in the embellishment overlay circuit 12 (FIG. 4). This would enable the embellishment images to be given a filled-in (solid) effect equivalent to the effect obtained when coefficients (k1, k2) of the multipliers 40, 42 are set at (1, 0) or (0, 1). Conversely, in the case of the second embodiment the multipliers 40 and 42 and the adder 44 could be used to superimpose the embellishment images instead of the data selector 64. This would enable transparent embellishment images as well as filled-in ones.

Again, in the case of the two multipliers 40 and 42 and the adder 44 used by the circuit 12 to superimpose embellishments in the first embodiment, if k1 and k2 are both set at 1/2 to provide transparent images, the multipliers 40 and 42 do not need to be used. Instead, the same effect can be used by effecting a bit shift in the adder 44 to remove the low-order bit from the data that is added.

In the first and second embodiments, when memory capacity equivalent to one frame of image data is allocated for expanding embellishment images, as shown in FIG. 6, the same effect can be obtained by using one-frame flags in place of coordinate data. For example, the pixel data of an embellishment graphic in the embellishment effect bitmap data could be provided with a one-bit flag that could be used to determine the presence or absence of the graphic. Depending on the presence or absence of the flag, an adjustment could be made to the coefficients k1, k2 of the multipliers 40, 42, in the case of the first embodiment, or to the selection by the data selector 64, in the case of the second embodiment. In this way, the same effect could be obtained as when coordinate data is used.

In the first and second embodiments, embellishment effect bitmap data BMD1 is expanded and stored in the embellishment effect bitmap memory 26 or embellishment effect memory 24, this expansion is not limited to the memories 26 and 24 but may be effected in other storage areas prepared for the purpose.

The pointer images described in the third embodiment are examples and are not limitative, there being various other pointer images that can be applied to obtain the same type of effect.

The various types of memory used in the three embodiments, such as, the frame memory 222, embellishment image storage memory 224, embellishment image expansion memory 226 and embellishment image drawing memory 227 of the third embodiment can be configured with independent memory address spaces and controlled independently. Also, each could be defined as a memory area in a shared address space controlled by the CPU 20.

In the first and second embodiments a liquid crystal display panel 16 is used as the light modulation unit of the projection display apparatus, but the invention is not limited to this and can use as the light modulation unit any unit that is able to modify luminance according to the image data. For example, a light modulation unit can be used that utilizes light reflected by a pixel array of mirror elements, or a CRT or plasma display panel or the like. Similarly, the electro-optical device used in the third embodiment is not limited to the liquid crystal light valve 216, with various other devices being usable for the same purpose such as a digital micromirror device (DMD, trademark of Texas Instruments Inc.), CRT or plasma display panel.

The first to third embodiments have been described using a projection display apparatus as an example, but this is not limitative, with the invention being applicable to various other types of image display apparatus. In the case of such other displays, the light valve or other such light modulation unit used by the projection display apparatuses would function as an image display apparatus that displays images directly.

In the described embodiments, part of the configuration implemented by hardware can instead be implemented by software and, conversely, part of the configuration implemented by software can instead by implemented by hardware.

INDUSTRIAL APPLICABILITY

The present invention is applicable to a variety of image display apparatuses. The projection display apparatuses of the present invention is applicable to projecting onto a screen images input by such as a computer and a video recorder.

What is claimed is:

1. A display control method of a projection display apparatus that displays embellishment image overlaid on a given original image, comprising:

using a remote controller so as to display a menu screen overlay;

using the remote controller so as to select from the menu a desired embellishment image to be overlaid among a plurality of embellishment images and a display condition including at least a color condition of the selected embellishment image to be overlaid;

erasing the menu screen and displaying an overlay of a display pointer image symbolizing the selected embellishment image to be overlaid and the selected display condition including the color condition of the selected embellishment image to be overlaid;

using the remote controller so as to move the display pointer image and display an overlay of a starting pointer image at a starting position determined for the embellishment image to be overlaid; and using the remote controller to again move the display pointer image and determine an end position for the embellishment-image to be overlaid so as to display an overlay of the embellishment image between the starting position and the end position determined for the embellishment image, the embellishment image being displayed according to the selected display condition including the color condition.

2. A display control method according to claim 1, wherein the starting pointer image is selected from a plurality of pointer images, each of the plurality of pointer images indicating a direction of the embellishment image to be overlaid, and when the display pointer image is moved, one pointer image is selected as the starting pointer image from the plurality of pointer images based on a direction in which the display pointer image is moving relative to the starting position.

3. A display control method according to claim 1, wherein the embellishment image represents at least one of a line and area whose color can be selected from a plurality of colors, and at least the display pointer image is displayed overlaid as an image having a color which corresponds to the selected color.

4. A display control method according to claim 2, wherein the embellishment image represents at least one of a line and area whose color can be selected from a plurality of colors, and at least the display pointer image is displayed overlaid as an image having a color corresponding to the selected color.

* * * * *